United States Patent [19]

Hosoe et al.

[11] 4,429,966

[45] Feb. 7, 1984

[54] CAMERA WITH PHOTOELECTRIC FOCUS DETECTING DEVICE

[75] Inventors: Kazuya Hosoe, Kunitachi; Takao Kinoshita, Tokyo; Masayoshi Yamamichi, Kawasaki, all of Japan

[73] Assignee: Canon Kabushiki Kaisha, Tokyo, Japan

[21] Appl. No.: 368,433

[22] Filed: Apr. 14, 1982

[30] Foreign Application Priority Data

| Apr. 16, 1981 | [JP] | Japan | 56-57451 |
| Apr. 17, 1981 | [JP] | Japan | 56-58174 |
| Apr. 17, 1981 | [JP] | Japan | 56-58175 |
| Apr. 17, 1981 | [JP] | Japan | 56-58176 |

[51] Int. Cl.³ .............. G03B 3/00; G03B 7/099; G03B 15/05; G03B 17/20
[52] U.S. Cl. ............... 354/406; 354/60 L; 354/417; 354/471; 354/479; 354/480
[58] Field of Search ........ 354/22, 23 R, 25 R, 354/25 P, 25 N, 25 A, 31, 31 F, 50, 51, 36, 38, 53, 56, 59, 60 E, 60 L, 42, 49, 127, 128, 139, 145, 149, 33

[56] References Cited

U.S. PATENT DOCUMENTS

| 3,762,294 | 10/1973 | Kosaka et al. | 354/25 R |
| 4,047,187 | 9/1977 | Mashimo et al. | 354/25 R |
| 4,192,589 | 3/1980 | Tokutomi | 354/60 L X |
| 4,295,717 | 10/1981 | Kitagawa | 354/60 L X |
| 4,359,275 | 11/1982 | Hasegawa | 354/56 |

*Primary Examiner*—William B. Perkey
*Attorney, Agent, or Firm*—Fitzpatrick, Cella, Harper & Scinto

[57] ABSTRACT

Disclosed is a single reflex camera with a photoelectric focus detecting device or a photoelectric converting element for receiving light from an object through a picture-taking lens. Light reflected by a photosensitive member or film during exposure thereof is directed to the photoelectric converting element. The picture-taking operation is detected or controlled in accordance with the output from the photoelectric converting element with respect to the light reflected from the photosensitive member.

26 Claims, 34 Drawing Figures

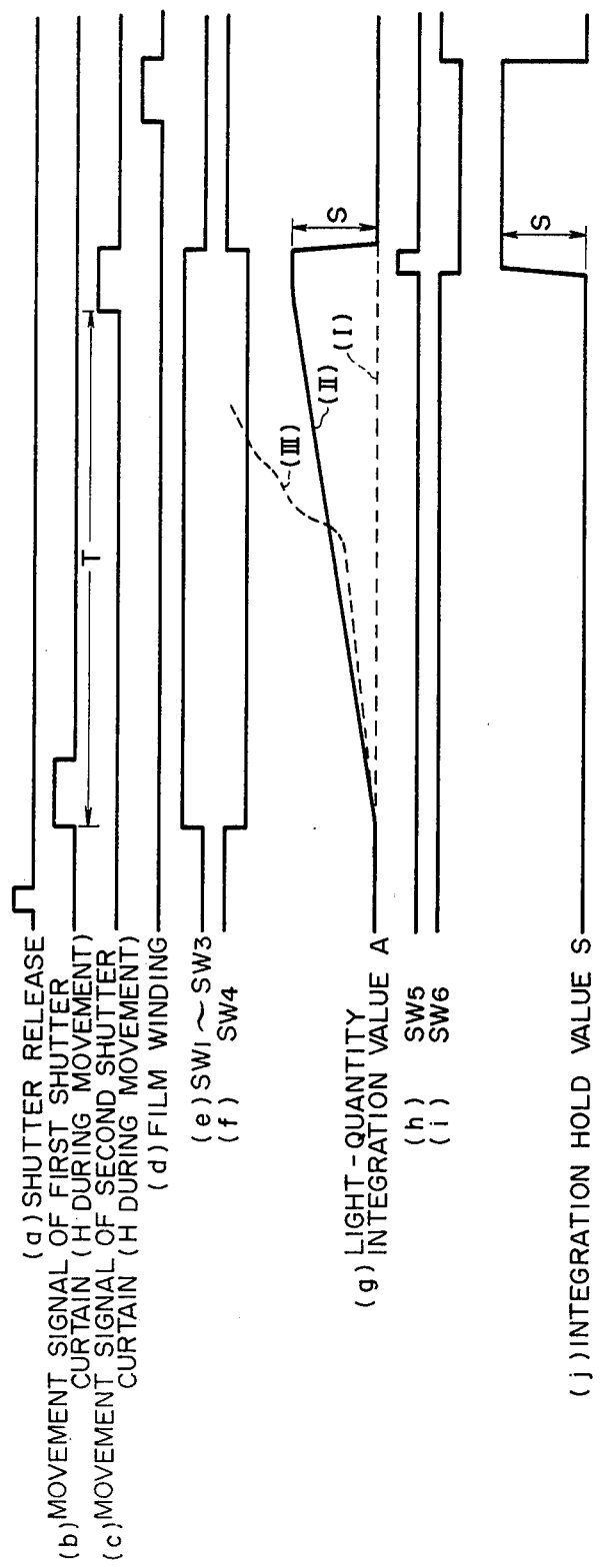

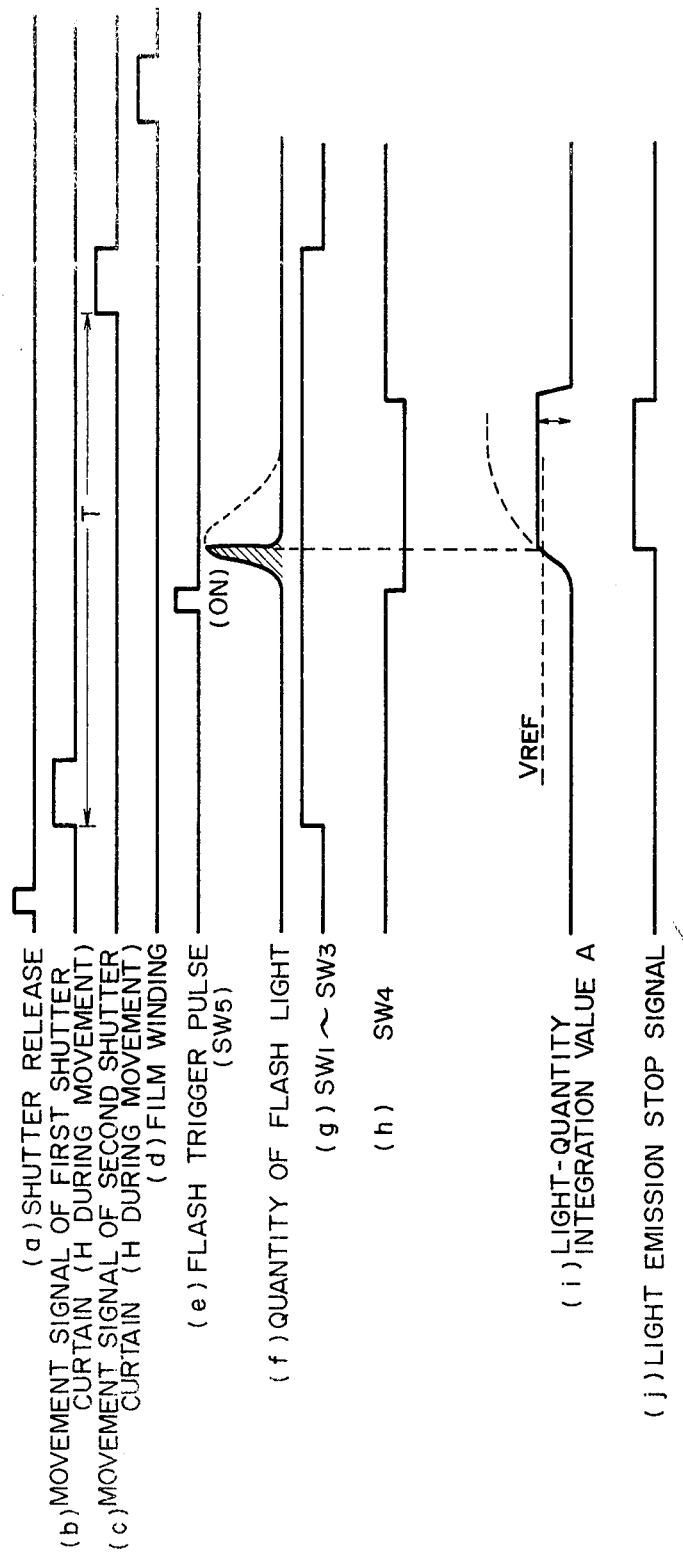

CAMERA WITH PHOTOELECTRIC FOCUS DETECTING DEVICE

BACKGROUND OF THE INVENTION

1. Field of the Invention

The present invention relates to a camera with a photoelectric focus detecting device and, more particularly, to a single lens reflex camera with a TTL type photoelectric focus detecting device having a photoelectric transducer means arranged to receive light from a picture-taking lens.

2. Description of the Prior Art

Various cameras with photoelectric focus detecting devices has been proposed and some of them have already been commercialized. The focus detecting device of the camera of such type is generally provided with a photoelectric transducer means.

In a camera, photoelectric conversion is necessary other than in focus detection. Photometry for the purpose of exposure control (exposure detection) is a good example. Therefore, with a camera of the type described above, it is very advantageous to use a common photoelectric transducer means for focus detection and exposure detection. Such concept has already been proposed in U.S. Pat. No. 4,047,187, Mashimo et al, SYSTEM FOR EXPOSURE MEASUREMENT AND/OR FOCUS DETECTION BY MEANS OF IMAGE SENSOR, patented on Sept. 6, 1977; corresponding to German DAS 25 64 230.

The proposal in this patent is an example of that the photoelectric transducer means in the focus detecting device is also used for an additional purpose. In a camera, however, photoelectric conversion is required for further various purposes. It is, therefore, advantageous to enable the photoelectric transducer means in the focus detecting device to be used for various purposes. This requirement is bocoming increasingly important.

SUMMARY OF THE INVENTION

It is an object of the present invention to provide a camera with a photoelectric focus detecting device, wherein the camera is so constructed that a photoelectric transducer means in the focus detecting device can be used for other camera functions, not limited to the exposure measurement.

It is another object of the present invention to provide a single lens reflex camera with a TTL type photoelectric focus detecting device having a photoelectric transducer means arranged to receive light from a picture-taking lens, wherein the camera is so constructed that the photoelectric transducer means can be used for other camera functions, not limited to the exposure measurement.

According to an aspect of the present invention, there is provided a camera with a photoelectric focus detecting device, including means for directing light reflected from a photosensitive member toward a photoelectric transducer means in the focus detecting device during exposure of the photosensitive member, and means for detecting and/or controlling a picture-taking operation by using an output from the photoelectric transducer means, responsive to the reflected light from the photosensitive member.

According to another aspect of the present invention, there is provided a single lens reflex camera with a focus detecting device, wherein a photoelectric transducer means is arranged at an appropriate position within a mirror box of the camera so that the light transmitted through a part of a finder mirror can be directed to the photoelectric transducer means by an auxiliary mirror therebehind, and wherein the auxiliary mirror is provided with means, such as a mirror segment, for directing toward the photoelectric transducer means the light reflected from a photosensitive member during exposure thereof, when the auxiliary mirror is withdrawn from the picture-taken optical path.

In the embodiments to be described hereinafter, the above-mentioned further camera functions, that is, detection and/or control of the picture-taking operation include confirmation of exposure of the photosensitive member, discrimination of whether the exposure is correct, confirmation of operation of a flash device, discrimination of whether the quantity of the emitted flash light is correct, control of the quantity of the flash light to be emitted, or exposure control in a non-flash picture-taking mode. However, various other functions may be attained.

According to an embodiment of the present invention, as the photoelectric transducer means a CCD photosensor with an overflow drain gate is used. For various functions other than the focus detection, the overflow drain gate is opened such that an output signal from the photosensor is obtained through the overflow drain gate, whereby the detection and/or control as described above are performed.

The above and other objects and features of the present invention will become apparent from the following description when taken in conjunction with the accompanying drawings.

BRIEF DESCRIPTION OF THE DRAWINGS

FIGS. 1A to 1C are views for illustrating the principle of focus detection by a photoelectric focus detecting device to which the present invention can be applied, wherein FIG. 1A shows the optical arrangement of the device, FIG. 1B shows the light-receiving sections of a photoelectric transducer, and FIG. 1C shows the manner according to which the sharpness of the image at three points in FIG. 1A changes;

FIG. 14 is a timing chart of various control signals supplied to the photoelectric transducer and the circuit for detecting the light reflected from the photosensitive member, shown in FIG. 12, and the signal showing the quantity of light received by the photosensitive member (quantity of light incident on the film), in the exposure detection mode of the first embodiment of the present invention;

FIG. 23 is a timing chart of various control signals supplied to the photoelectric transducer and the circuit for detecting the reflected light from the photosensitive member, shown in FIG. 22, and the signal showing the quantity of light received by the photosensitive member (the quantity of light incident on the film), in the automatic light control mode of the fourth embodiment.

DESCRIPTION OF THE PREFERRED EMBODIMENTS

Figure 1A:
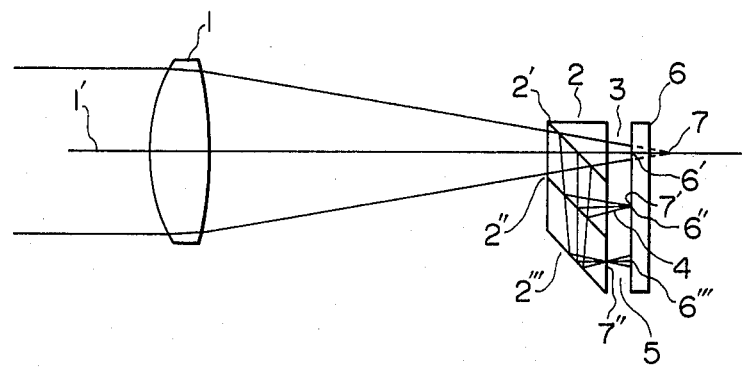

Referring to FIG. 1A, an imaging lens 1 has an optical axis 1'. A beam splitter 2 is arranged in the optical path of the imaging lens 1 and has semi-transmittal sections 2' and 2" and a total reflection section 2'". Light emerging from the imaging lens 1 becomes incident on the semi-transmittal section 2', and is then divided by the semi-transmittal section 2" and the total reflection section 2'" into three separate light rays 3, 4 and 5. If the semi-transmittal section 2' transmits about one third of the incident light and reflects the remaining two thirds, and the semi-transmittal section 2" transmits about half of the incident light and reflects the remaining half of the incident light, it is apparent that the energy for the three divided light rays 3, 4 and 5 becomes substantially the same. A photoelectric transducer 6 has three light-receiving sections 6', 6" and 6'".

If the convergent point of the light ray 3 is at point 7, it is easily seen that the convergent points of the divided light rays 4 and 5 are at points 7' and 7", respectively. If the convergent point 7 of the light ray 4 which is reflected and divided by the semi-transmittal sections 2' and 2" coincides with the light-receiving section 6", the convergent point 7 of the light ray 3 incident on the light-receiving section 6' is located behind the light-receiving section 6', and the convergent point 7" of the light ray 5 incident on the light-receiving section 6'" is located in front of the light-receiving section 6'41. The deviations of these converging points from the light-receiving sections become the same if the distances between the semi-transmittal sections 2' and 2" and between 2" and the total reflection section 2'" are equal to each other. As a result, the sharpness of the image on the light-receiving section 6" becomes maximum, and the sharpnesses of the images on the light-receiving sections 6' and 6'" become low but are similar to each other.

Figure 1B:
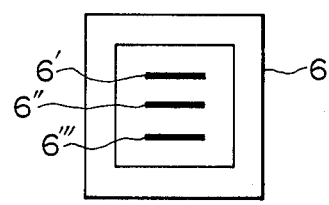
Figure 1C:
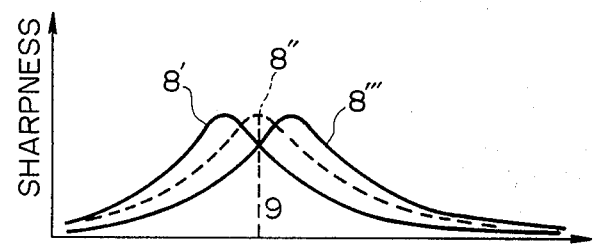

If the imaging lens 1 is displaced along the optical axis 1', the sharpnesses of the images on the light-receiving sections 6', 6" and 6'" change as shown in FIG. 1C. Curves 8', 8" and 8'" representing changes in the sharpnesses of the images on the light-receiving sections 6', 6" and 6'" form peaks in FIG. 1C, wherein the displacement of the imaging lens 1 is plotted as the abscissa and the sharpness is plotted as the ordinate. The condition shown in FIG. 1A corresponds to point 9 shown in FIG. 1C. If the light-receiving surface of the light-receiving section 6" of the photoelectric transducer 6 is arranged to substantially coincide with the predetermined focal plane (the film surface in the case of a camera) of the imaging lens 1, it is detected that the imaging lens 1 is in the in-focus state under the condition shown in FIG. 1A, that is, when the relationships between the sharpnesses of the images on the respective light-receiving sections 6', 6" and 6'" are represented by the point 9 in FIG. 1C. Then, it is apparent from FIG. 1C that the relationships between the sharpnesses 8' and 8'" are inverted according to whether the imaging plane surface of the lens 1 is in front of or behind the light-receiving section 6". In this manner, the near-focus state and the far-focus state can be detected.

FIG. 1B is a front view of the photoelectric transducer 6 wherein the respective light-receiving sections 6', 6" and 6'" comprise, for example, belt-shaped linear CCDs. However, the shape of the light-receiving sections is not necessarily limited to this shape.

Figure 2:
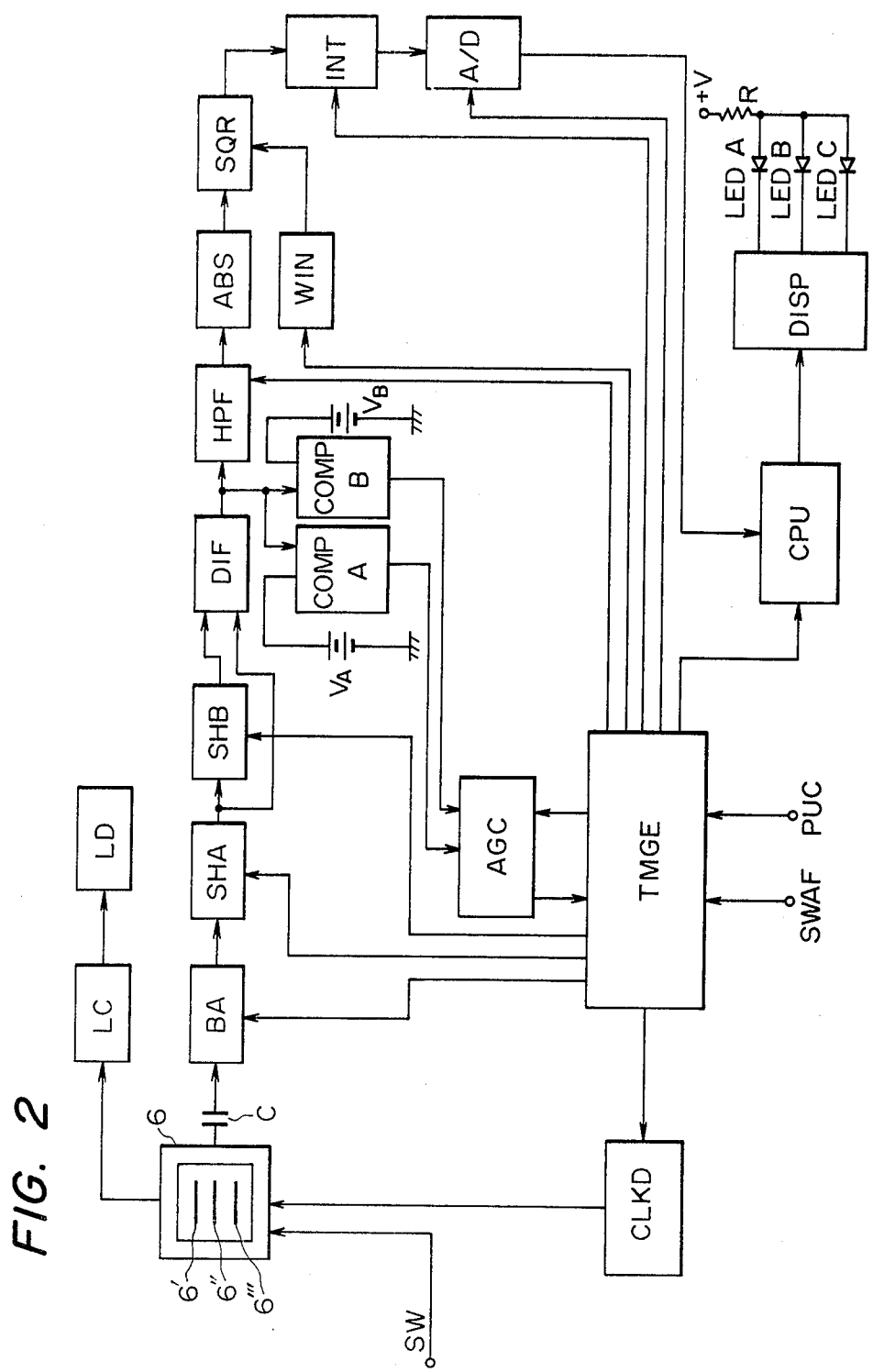
FIG. 2 is a block diagram showing the configuration of an electric circuitry according to an embodiment of the present invention wherein a focus detecting device according to the principle shown in FIG. 1 is used.

A focus detecting system is thus obtained which has the beam splitter 2 and the photoelectric transducer 6 with the three light-receiving sections 6', 6" and 6'". FIG. 2 shows a block diagram of an electric circuit which reads image signals from the light-receiving sections 6', 6" and 6'", extracts sharpness signals, and discriminates the magnitudes of sharpness of the image at three points. Many of the blocks shown in FIG. 2 are of known configuration and details of them are shown in a series of applications as in U.S. patent application Ser. No. 59,635, "Focus Detecting System", Konoshita et al, filed on July 23, 1979 (corresponding German DOLS 29 30 636), U.S. patent application Ser. No. 151,703, "Image Sharpness Detecting System", Kawabata et al, filed on May 20, 1980 (corresponding German Patent Application P 30 19 908.7), and so on. Therefore, only parts which are essentially related to the present invention will be described.

Referring to FIG. 2, the photoelectric transducer 6 shown in FIG. 1 comprises a CCD having the three light-receiving sections 6', 6" and 6'". A series of clock signals for operating the CCD 6 are supplied from a clock driver CLKD. These clock signals are supplied to initiate a series of operations on the CCD 6 such as integration, transfer, resetting and so on in a predetermined order. The charge stored for a predetermined period of time in the CCD 6 is charge-voltage converted at the output of the CCD 6 and is thereafter input, as an image signal, to a balance adjusting circuit BA through a capacitor C for suppressing noise. These image signals corresponding to the three light-receiving sections 6', 6" and 6'" of the CCD 6 are time-serially read out in an order which is determined by the configuration of the CCD 6.

Figure 3:
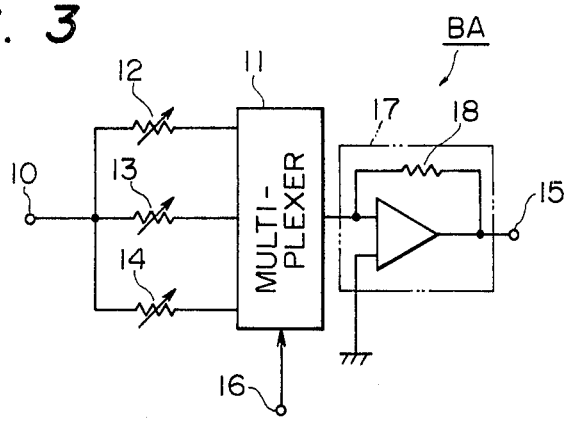
FIG. 3 is a partial circuit diagram showing an example of a balancing circuit in the circuitry shown in FIG. 2.

The balance adjusting circuit BA, as shown in FIG. 3, has a multiplexer 11 of known configuration and three variable resistors 12, 13 and 14. Referring to FIG. 3, the image signal as described above is supplied to the multiplexer 11 through the variable resistors 12, 13 and 14. In response to a synchronizing signal received from a terminal 16, the multiplexer 11 receives the image signals corresponding to the respective light-receiving sections 6', 6" and 6'" through the variable resistors 12, 13 and 14, respectively, and outputs them to an amplifier 17. The variable resistors 12, 13 and 14 control the balance of the image signals from the light-receiving sections 6', 6" and 6'". The outputs from the resistors 12, 13 and 14 are input through the multiplexer 11 to the amplifier 17 where the gains of the respective images are controlled according to their ratios by a feeding resistor 18 and then are input to the next electric circuit. Balance adjustment of the image signals is useful when there is an imbalance in the three light rays 3, 4 and 5 divided by the beam splitter 2. The synchronizing signal is supplied at the terminal 16 from a timing generator TMGE. Although three variable resistors are used in this embodiment, two variable resistors may be used to balance two image signals in relation to the remaining image signal.

Signal processing in this circuitry must be performed according to a series of synchronizing signals which are supplied from the timing generator TMGE. In response to an operation command signal SWAF of the circuitry (a signal generated in synchronism with the depresssion of a shutter release button to the first position in the case of a camera) and a power clear signal PUC, the timing generator TMGE generates the various synchronizing signals to the respective blocks in the circuitry in a predetermined order. The timing generator TMGE may be of known configuration and need only generate the group of synchronizing signals suitable for the operation of the circuitry of this embodiment. The clock driver CLKD also operates in response to the timing generator TMGE.

The image signals adjusted by the balance adjusting circuit BA are input to a first sampling and holding circuit SHA. The first sampling and holding circuit SHA shapes the image signals from the CCD 6. In response to a sampling pulse from the timing generator TMGE synchronous with the output of the image signals from the CCD 6, the first sampling and holding circuit SHA samples and holds the level of the respective image signals.

The temperature and accumulating time of the CCD are influenced by the dark current since the actual CCD comprises a semiconductor. Therefore, the actual image signal includes the dark current level superposed on the signal corresponding to the actual amount of incident light. Thus, the image signal as it is contains a noise component. Part of the light-receiving section of the CCD is masked with an aluminum mask or the like, and a signal output from this part is considered to be the dark current level. Then, the difference is obtained between the output from the unmasked light-receiving section and the output of the masked part (to be referred to as a dark current bit hereinafter), that is, the dark current level, to thereby remove the influence of the dark current. The dark current bit (not shown) is included at the end of each of the light-receiving sections 6', 6" and 6'" of the CCD 6, so that this bit is output first. A second sampling and holding circuit SHB samples and holds the output level of these dark current bits. The second sampling and holding circuit SHB receives commands from the timing generator TMGE for holding the output level. A differential amplifier DIF receives the output signal from the sampling and holding circuit SHA and the output signal from the sampling and holding circuit SHB for taking the difference between these two inputs. The image signals obtained as the output of the differential amplifier DIF are signals whose dark current level is cancelled and which correctly correspond to the amount of incident light.

The output of the differential amplifier DIF is input to a high-pass filter HPF and to two comparators COMPA and COMPB. A reference voltage VA is supplied to the comparator COMPA and a reference voltage VB is supplied to the comparator COMPB. These comparators COMPA and COMPB constitute a window comparator.

Figure 4A:
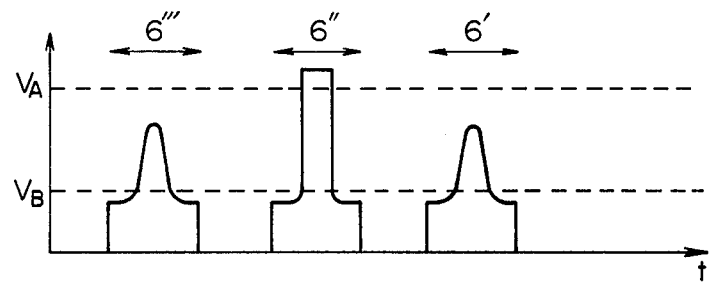
FIGS. 4A to 4C are waveform charts illustrating the operation of a window comparator for discriminating the accumulation time, in the circuitry shown in FIG. 2.
Figure 4B:
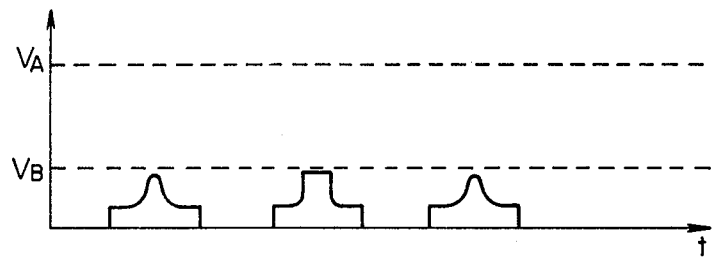
Figure 4C:
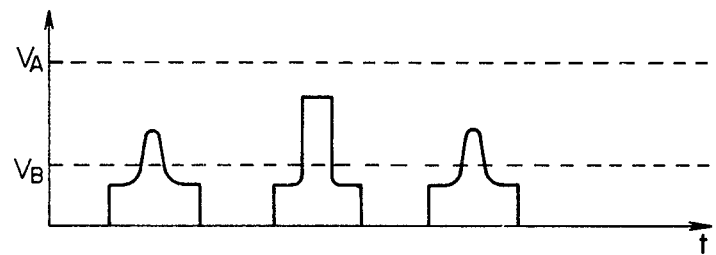

The mode of operation of the window comparator will now be described with reference to FIGS. 4A-4C. FIGS. 4A, 4B and 4C show the relationship between the peak value of the image signal compensated for the dark current level (to be referred to as the dark current-compensated image signal hereinafter) and the reference voltage VA and VB, the time being plotted as the abscissa and the voltage being plotted as the ordinate. The ranges in FIG. 4A indicated by arrows at 6'", 6" and 6' represent the timings with which the image signals are output from the light-receiving sections 6'", 6" and 6', respectively. In FIG. 4A, part of the dark current-compensated signal (part of 6") exceeds the reference voltages VA and VB, and the signal level is too high. In this case, the outputs of both the comparators COMPA and COMPB are at high level. In FIG. 4B, the dark current-compensated signal is lower than the reference voltage VB and the signal level is too low. In this case, the outputs of both the comparators COMPA and COMPB are at low level. In FIG. 4C, the peak value of the dark current-compensated signal is between the reference voltages VA and VB and is at a suitable level. In this case, only the output of the comparator COMPB is at high level, and the output of the comparator COMPA is at low level. If the reference voltages VA and VB are so selected to set the suitable level of the dark current-compensated signal, the combination of the high or low level of the outputs of the comparators COMPA and COMPB indicates the appropriateness of the dark current-compensated signal level. If $VA > VB$ in this embodiment, when the outputs of both the comparators COMPA and COMPB are at high level, it indicates that the dark current-compensated signal is at too high level including saturated level. When the outputs of both the comparators COMPA and COMPB are at low level, it indicates that the dark current-compensated signal level is too low. Only when the output of the comparator COMPA is at low level and the output of the comparator COMPB is at high level, it indicates that the dark current-compensated signal is at a suitable level.

The outputs of the comparators COMPA and COMPB are supplied to a integrating time control circuit AGC for maintaining the appropriate dark current-compensated signal level by shortening the accumulating time of the CCD 6 when it is too high and by prolonging the integrating time when it is too low. In response to a synchronizing signal from the timing generator TMGE, the accumulating time control circuit AGC operates so that it may be able to discriminate the state of the outputs of the comparators COMPA and COMPB at the timing at which the dark current-compensated signals are output from the light-receiving sections 6', 6" and 6'''. Based on the output state of the comparators COMPA and COMPB, the accumulating time control circuit AGC outputs a command signal to shorten or prolong the accumulating time to the timing generator TMGE. In response to the command signal, the timing generator TMGE so operates the clock driver CLKD that the accumulating time of the CCD 6 may be shortened or prolonged at the next output from the CCD 6.

The high-pass filter HPF evaluates the degree of change in the image. The high-pass filter extracts the high frequency components from the image signal as a first step in evaluating the sharpness of the image. The timing generator TMGE supplies to the high-pass filter HPF a synchronizing signal which is synchronous with the timing at which the image signals corresponding to the light-receiving sections 6', 6" and 6''' of the CCD 6 are input. This is to prevent the generation of an output from the light-pass filter HPF which is independent of the sharpness of the image and which is caused by an abrupt change in the signal at the initial period. This synchronizing signal temporarily resets the high-pass filter HPF.

The output of the high-pass filter HPF is supplied to a squaring circuit SQR through an absolute value circuit ABS. The absolute value circuit ABS takes the absolute value of the output from the high-pass filter HPF. Since there may be both a positive and a negative change in the image signal (dark to bright and bright to dark), if the output of the high-pass filter HPF were directly supplied to an integrating circuit INT to be described later, the outputs may cancel each other and the signal representing the sharpness of the image might become zero depending upon the image pattern. The absolute value circuit ABS is incorporated to prevent this. The squaring circuit SQR may utilize, for example, nonlinear input/output characteristics of a semiconductor. The function of the squaring circuit SQR in this circuitry is to emphasize and evaluate the peak output of the high-pass filter HPF, that is, the state wherein the change of the image signal with time is great and the sharpness is high. The squaring circuit SQR incorporates a window function generating circuit WIN. This is to prevent, by lowering the weight for evaluation of the sharpness of the image near the edge of the field of view, the introduction of errors in the normal evaluation of the sharpness when an image outside the field of view enters inside the field of view as part of the out-of-focus image. This is also to prevent the introduction of transient error when another image enters the field of view due to blurring of the image formed by the imaging lens 1. The output of the window function generating circuit WIN controls the gain of the squaring circuit SQR so that it may become low at the edge of the field of view and become high at the center. Thus, in response to the timing signal from the timing generator TMGE synchronous with the initiation of operation of the light-receiving sections 6', 6" and 6''' of the CCD 6, the window function generating circuit WIN controls the gain of the squaring circuit according to the relationship determined in correspondence with the location (location in the field of view).

The output of the squaring circuit SQR including the emphasized sharpness data is input to the integrating circuit INT which performs integration for the entire area of the light-receiving sections and outputs the sharpness of the image at each of the light-receiving sections. A synchronizing signal is also supplied from the timing generator TMGE to the integrating circuit INT so that integration and integration resetting may be performed at the timings corresponding to the light-receiving sections 6', 6" and 6'''. In this manner, the output of the integrating circuit INT corresponds to the electric output such as the sharpness of the respective images corresponding to the order of output from the light-receiving sections 6', 6" and 6''' of the CCD 6.

The analog output of the integrating circuit INT is input to an A-D converting circuit A/D for conversion into a digital value so that the signal processing may be facilitated for discrimination at a central processing unit CPU of an in-focus state, a near-focus state, and a far-focus state of the imaging lens 1.

FIGS. 5A–5F show the output waveforms of the respective blocks of the circuitry in order to clarify the analog processing of the series of signals representing the sharpness of the image, starting from the read-out of the image signals from the light-receiving sections 6', 6" and 6''' of the CCD 6 (the field of view for the three images) until the integration at the integrating circuit INT. In FIGS. 5A–5F, time is plotted as the abscissa and the voltage or current output is plotted as the ordinate in arbitrary units. The ranges indicated at arrows 6', 6" and 6''' in FIG. 5 represent the timings with which the signals corresponding to the light-receiving sections 6', 6" and 6''' of the CCD 6 are output and processed. The state of the respective images corresponds to the in-focus state of the imaging lens 1 in which the sharpness of the image of the light-receiving section 6″ is highest, that is, the sharpness as shown at 9 in FIG. 1C is highest. FIG. 5 shows the state of the signal output from the CCD 6 only once, but these signals are repeatedly output in practice.

Figure 5A:
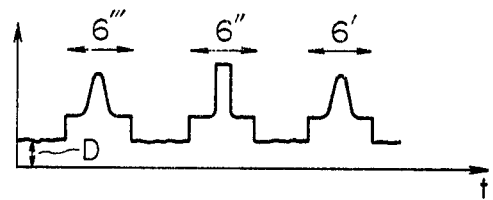
FIGS. 5A to 5F are waveform charts illustrating the outputs from the main blocks in the circuitry shown in FIG. 2.
Figure 5B:
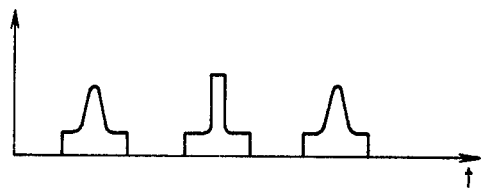
Figure 5C:
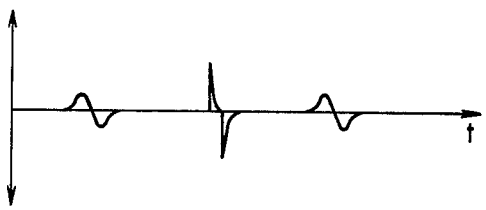
Figure 5D:
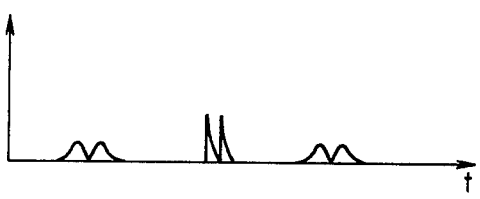
Figure 5E:
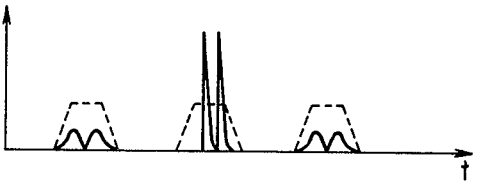
Figure 5F:
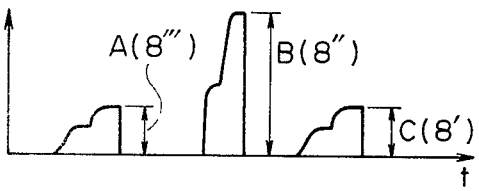

FIG. 5A shows the image signal which is output from the CCD 6 and has passed through the sampling and holding circuit SHA. The order for output of the images from the light-receiving sections is 6‴, 6″ and 6′. The voltage indicated by letter D is the dark current level, which is first output and is held by the sampling and holding circuit SHB. FIG. 5B shows the output of the differential amplifier DIF, that is, the dark current-compensated signal in which the dark current level D is cancelled. FIG. 5C shows the output of the high-pass filter HPF. FIG. 5D shows the output of the absolute value circuit ABS. FIG. 5E shows the output of the squaring circuit SQR, wherein the trapezoids indicated by the broken lines show the manner in which the gain of the squaring circuit SQR changes within the field of view according to the shape of the window generated by the window function generating circuit WIN described above. FIG. 5E shows the output of the integrating circuit INT wherein levels A(8‴), B(8″) and C(8′) correspond to the sharpnesses of the images on the light-receiving sections 6‴, 6″ and 6′, respectively. Specifically, A, B and C in FIG. 5F correspond to the levels of the curves 8‴, 8″ and 8′ of FIG. 1C at the point 9.

The levels A, B and C are converted into digital data by the A-D converting circuit A/D described above and are input to the central processing circuit CPU. The CPU computes the relationships among the levels A, B and C according to the conditions of the in-focus state, the near-focus state, the far-focus state, and the interruption of the discrimination which are set in advance. Basically, in the in-focus state, conditions B>A, B>C and A=C are satisfied. In the near-focus state, condition C>A is satisfied, and in the far-focus state, condition A>C is satisfied. The CPU discriminates which set of conditions is satisfied and outputs a signal corresponding to one of these three states. As the algorithm for the discrimination at the CPU may be adopted the algorithm as disclosed in U.S. patent application Ser. No. 151,533, "Focus Detecting System", Sakai et al, filed on May 19, 1980, now U.S. Pat. No. 4,341,953 (corresponding German Patent Application No. P 30 19 901.0) or in U.S. patent application Ser. No. 310,373, "Focusing State Discriminating System" by Sakai et al, filed on Oct. 9, 1981, of the same assignee.

The output signal from the CPU is supplied to a display circuit DISP. The display circuit DISP basically comprises a logic circuit and a driver circuit for driving display elements such as light-emitting diodes. In response to a command signal from the CPU, a light-emitting diode LEDB is lit in the in-focus state. In the near- and far-focus states, light-emitting diodes LEDA and LEDC are lit. In this manner, the operator is able to confirm the in-focus, near-focus and far-focus states of the imaging lens 1. A protective resistor R supplies a voltage V to the light-emitting diodes LEDA to LEDC. Although the display means comprises light-emitting diodes in this embodiment, it may be provided by liquid crystals, electrochromies, or the like.

Figure 9:
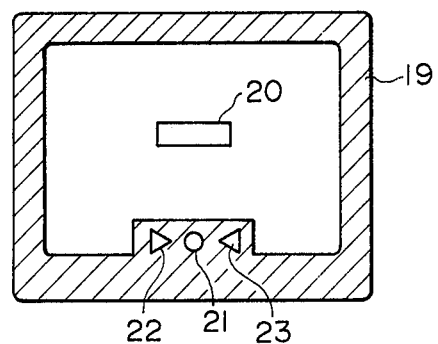
FIG. 9 is a view showing an example of the indication, within a finder of a camera, of the signal from the focusing detecting device.

FIG. 9 shows a focus detection display suitable for focusing of the photographic lens of a camera, which involves a range finder field frame 19 of the camera, a field mark 20 representing the location of the field of view, and a mark 21 representing the in-focus state of the photographic lens. The light-emitting diode LEDB shown in FIG. 2 is arranged immediately behind the mark 21. Arrow marks 22 and 23 (arrows represent the direction of rotation of a distance dial of the photographic lens for relocating it from the out-of-focus position to the in-focus position) represent the near-focus state and the far-focus state, respectively. The light-emitting diodes LEDC and LEDA shown in FIG. 2 are arranged immediately behind the arrow marks 22 and 23, respectively. In this manner, the operator is capable of confirming the focusing state of the photographic lens simply by observing which one of these marks is lit. If the mark 21 representing the in-focus state is lit, the focusing operation is interrupted. If the arrow mark 22 or 23 is lit, the distance dial need only be rotated in the direction indicated by the arrow mark 22 or 23, respectively, until the in-focus mark 21 is lit.

The configuration of the timing generator TMGE will be described with reference to FIGS. 6 and 7.

Figure 6:
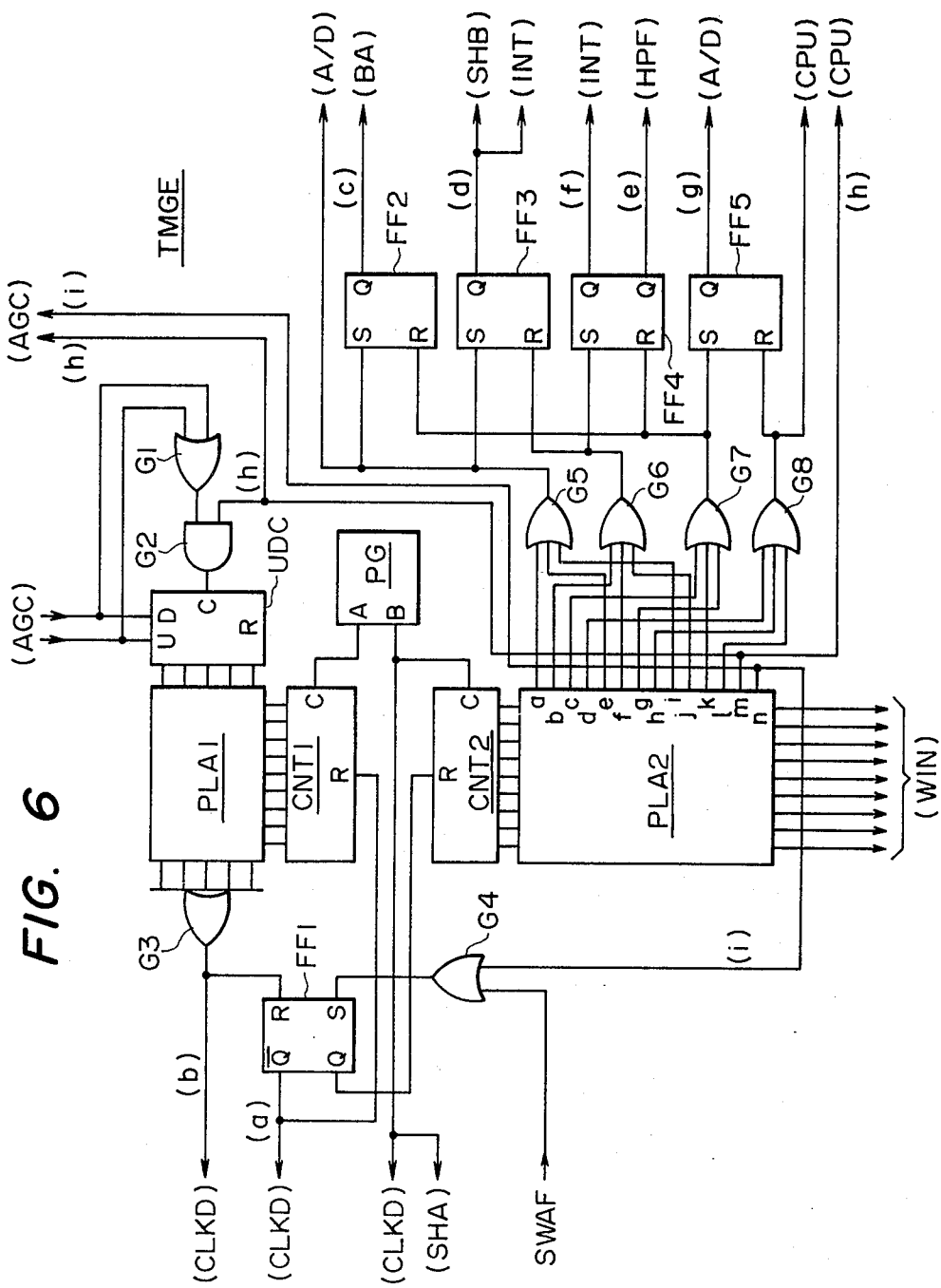
FIG. 6 is a block diagram showing the configuration of a timing generator in the circuitry shown in FIG. 2.
Figure 7:
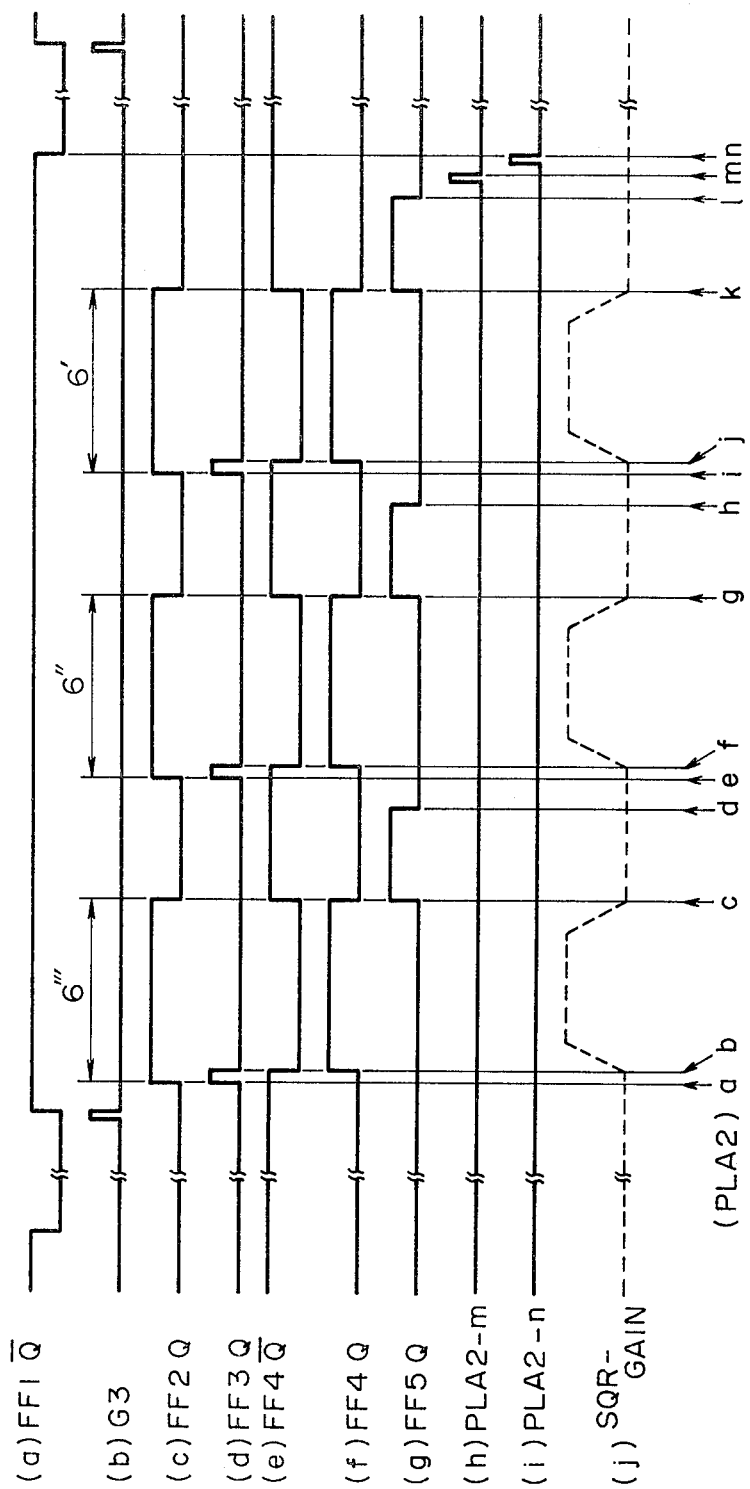
FIG. 7 is a timing chart of various control timing signals from the timing generator shown in FIG. 6.

Referring to FIG. 6, the part of the circuitry consisting of an up/down counter UDC, a counter CNT1, a programmable logic array PLA1 and OR gates G1 to G3 mainly serves to regulate the accumulating time of the CCD 6. The up/down counter UDC is set in the up-counting mode in response to an accumulating time shortening command from the accumulating time control circuit AGC and is set in the down-counting mode in response to an accumulating time prolonging command therefrom. The up/down counter UDC is so controlled to count one pulse at a predetermined timing to be described later to set a different accumulating time only if an accumulating time change command is output from the accumulating time control circuit AGC. The CNT1 counts a pulse train A from a pulse generator PG. When the count of the counter CNT1 reaches a predetermined value which is set by the output of the up/down counter UDC, the programmable logic array PLA1 generates a timing pulse which is output through the OR gate G3. The output of the OR gate G3 is supplied to the clock driver CLKD, in response to which the clock driver CLKD generates a start pulse (shift pulse) for initiating the output of the signals from the CCD 6. The start pulse is supplied to the CCD 6. The output waveform of the OR gate G3 is as shown in FIG. 7(b).

An RS flip-flop FF1 generates a control signal to the clock driver CLKD to normally set the CCD 6 in the clear condition and to release the clear condition only during the period in which signal integration is required. The RS flip-flop FF1 is set by the operation command signal SWAF described above which is supplied through an OR gate G4 or a pulse signal for repetition of the operation which is generated at a predetermined timing to be described later. The RS flip-flop FF1 is reset by the output of the OR gate G3. The Q output of the RS flip-flop FF1 as shown in FIG. 7(a) is supplied as a control signal to the clock driver CLKD. The CCD 6 has an overflow drain gate which is opened or closed according to the $\overline{Q}$ output of the RS flip-flop FF1 (the gate is opened when the $\overline{Q}$ output is at high level and is closed when it is at low level) to thereby control the integration of the signal charge by the CCD 6. The interval shown in FIG. 7(a) in which the $\overline{Q}$ output of the RS flip-flop FF1 is at low level corresponds to the accumulating time of the signal charge, which is defined as an interval from the predetermined timing of setting the RS flip-flop FF1 to the generation of the pulse from the OR gate G3. Since the timing at which the pulse is generated from the OR gate G3 is regulated by the output from the up/down counter UDC, the accumulating time of the signal charge of the CCD 6 is regulated by the output of the up/down counter UDC. The Q output of the RS flip-flop FF1 is supplied to the counter CNT1 as a reset signal. Therefore, the counter CNT1 performs counting only during the interval in which the $\overline{Q}$ output of the flip-flop FF1 is at low level and is kept reset in other conditions.

The circuitry part consisting of a counter CNT2, a programmable logic array PLA2, OR gates G5 to G8, and RS flip-flops FF2 to FF5 mainly serves to control the respective parts and the overall sequence of the circuit shown in FIG. 2. The counter CNT2 counts a pulse train B from the pulse generator PG. In this embodiment, the CCD 6 is of single-phase driven type. The pulse train B is also supplied to the clock driver CLKD which generates from the pulse train B a drive clock pulse (transfer clock pulse) to be supplied to the CCD 6. The count of the counter CNT2 and the drive (transfer of the charge) are in one-to-one correspondence. The pulse train B is also supplied to the sampling and holding circuit SHA as the sampling pulse. The content of the programmable logic array RLA2 is so programmed that, based on the count output from the counter CNT2, pulses are generated from terminals a to n at the respective timings shown in FIGS. 7(a) to 7(n) after the pulse is generated from the OR gate G3. In response to the outputs from the terminals a, e and i of the programmable logic array PLA2, the OR gate G5 produces an output which is supplied to the set terminals of the RS flip-flops FF2 and FF3. In response to the outputs from the terminals b, f and j of the programmable logic array PLA2, the OR gate G6 produces an output which is supplied to the reset terminal of the RS flip-flop FF3 and the set terminal of the RS flip-flop FF4. In response to the outputs from the terminals c, g and k of the programmable logic array PLA2, the OR gate G7 produces an output which is supplied to the reset terminals of the RS flip-flops FF2 and FF4 and to the set terminal of the RS flip-flop FF5. In response to the outputs from the terminal of the RS flip-flop FF5. In response to the outputs from the terminals d, h and l of the programmable logic array PLA2, the OR gate G8 produces an output which is supplied to the reset terminal of the RS flip-flop FF5. The Q outputs of the RS flip-flops FF2 to FF5 and the $\overline{Q}$ output of the RS flip-flop FF4 are shown in FIGS. 7(c) to 7(g) as contrasted with the timings (shown in FIG. 7(b)) at which the signals are output from the respective light-receiving sections 6''', 6'' and 6' of the CCD 6. The Q output FIG. 7(c)) of the RS flip-flop FF2 is supplied to the balance adjusting circuit BA. The high level interval of the Q output (FIG. 7(d)) of the RS flip-flop FF3 corresponds to the dark current bit at the end of each of the outputs of the light-receiving sections 6''', 6'' and 6', and is supplied to the sampling and holding circuit SHB as a sampling pulse. The Q output of the RS flip-flop FF3 is also supplied to the integrating circuit INT as a reset signal. The low level interval of the $\overline{Q}$ output (FIG. 7(e)) of the RS flip-flop FF4 corresponds to the effective image signal bit of the outputs of each of the light-receiving sections 6''', 6'' and 6', and is supplied to the high-pass filter HPF as a reset signal. In this manner, the high-pass filter HPF is released from the reset condition only during the low level interval of the $\overline{Q}$ output of the RS flip-flop FF4. The Q output (FIG. 7(f)) of the RS flip-flop FF4 is supplied to the integrating circuit INT as an integration command signal. The Q output (FIG. 7(g)) of the RS flip-flop FF5 is supplied to the A-D conversion circuit A/D as an A-D conversion command. The output of the OR gate G5 is supplied to the A-D converting circuit A-D as a reset signal. The output of the OR gate G3 is supplied to the central processing circuit CPU as a strobe pulse for storing the output from the A-D converting circuit A/D. The output (FIG. 7(h)) from the terminal m of the programmable logic array PLA2 is supplied to the AND gate G2 as a count pulse of the up/down counter UDC as well as to the accumulating time control circuit AGC and the central processing unit CPU as a latch pulse for latching the outputs thereof. The output (FIG. 7(i)) from the terminal n of the programmable logic array PLA2 is supplied to the OR gate 4G as a set signal of the RS flip-flop FF1 as well as to the accumulating time control circuit AGC as a reset signal for the flip-flop therein. The Q output of these flip-flop FF1 (the inverted signal of the $\overline{Q}$ output shown in FIG. 7(a)) is supplied to the counter CNT2 as a reset signal. If the counter CNT1 is in the count-enabling mode, the counter CNT2 is placed under the reset condition. If the counter CNT1 is under the reset condition, the counter CNT2 is set in the count-enabling mode. The count of the counter CNT2 is output to the window function generating circuit WIN. In response to the count output from the counter CNT2, the window function generating circuit WIN performs gain control so that the gain of the squaring circuit SQR changes as shown in FIG. 7(j). The window function generating circuit WIN may be of the configuration as disclosed in U.S. patent application Ser. No. 151,703, filed on May 20, 1980 by Kawabata et al, now U.S. Pat. No. 4,377,742 (corresponding German Patent Application No. P 30 19 908.7) of the assignee of the present invention.

Figure 8:
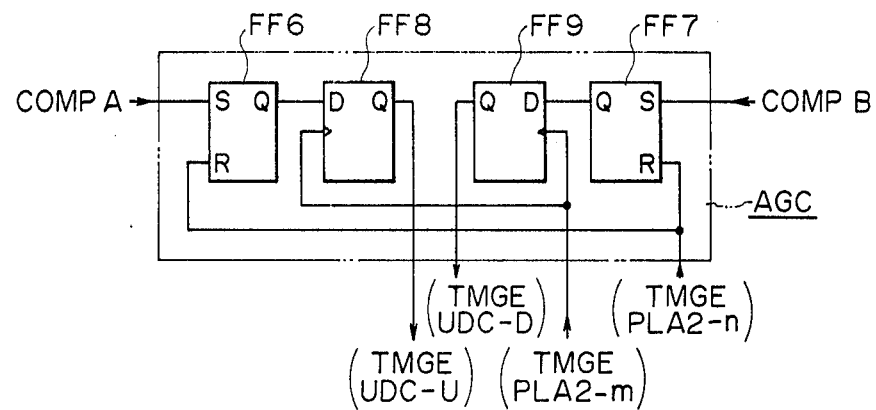
FIG. 8 is a block diagram showing the configuration of an accumulation time control circuit in the circuitry shown in FIG. 2.

The configuration of the accumulation time control circuit AGC will be described with reference to FIG. 8. Referring to FIG. 8, RS flip-flops FF6 and FF7 are set by outputs of high level from comparators COMPA and COMPB, respectively. Both these RS flip-flops FF6 and FF7 are reset by the output (FIG. 7(i)) of high level from a terminal n of the programmable logic array PLA2 of the timing generator TMGE shown in FIG. 6. D flip-flops FF8 and FF9 respectively latch the Q output from the RS flip-flop FF6 and the $\overline{Q}$ output from the RS flip-flop FF7, in response to the output (FIG. 7(h)) of high level from a terminal m of the programmable logic array PLA2 of the timing generator TMGE. Therefore, when the Q output of high level is available from the D flip-flop FF8, the accumulating time is shortened. On the other hand, when the Q output of high level from the RS flip-flop FF9 is available, the accumulating time is prolonged. These Q outputs from the RS flip-flop FF8 and FF9 are respectively supplied to count mode setting terminals U and D of the up/down counter in the timing generator TMGE shown in FIG. 6.

Figure 10A:
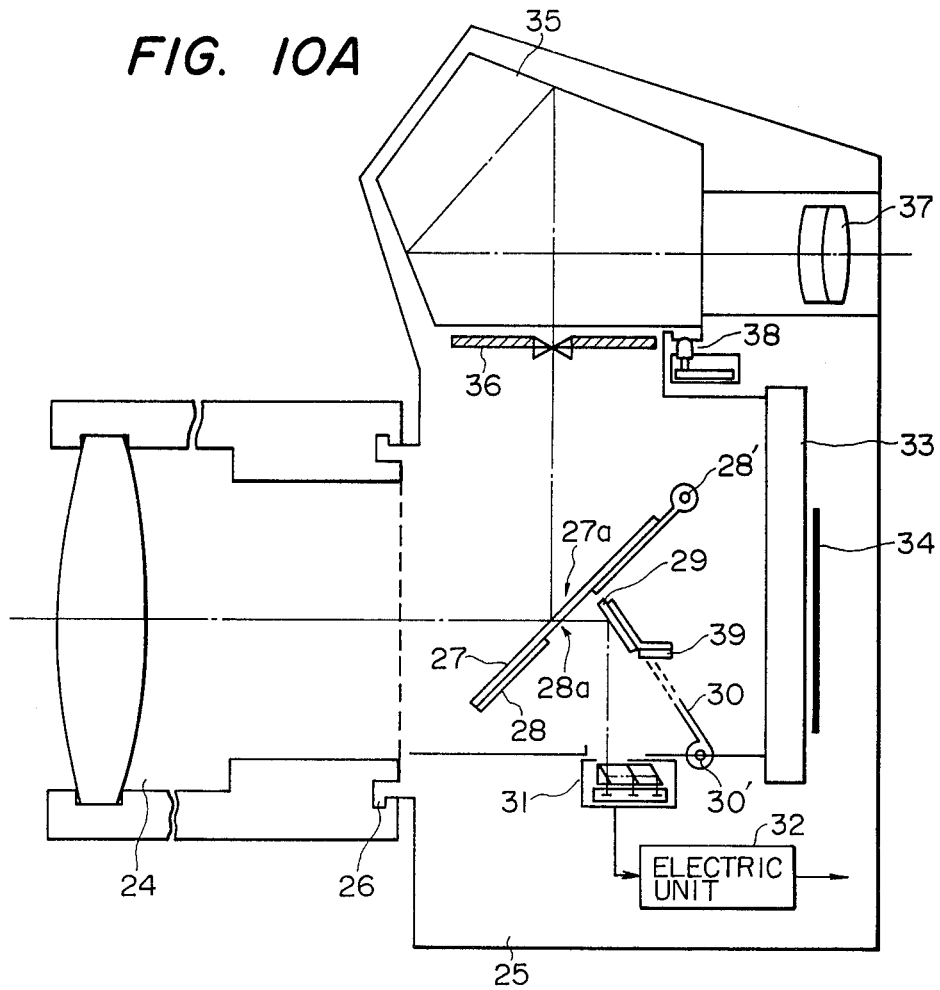
FIGS. 10A and 10B are views schematically showing the optical arrangement in the camera when the present invention is applied to a single lens reflex camera, wherein FIG. 10A corresponds to the non-exposure mode or focus detecting mode and FIG. 10B corresponds to the exposure mode or the picture-taking operation detection or control mode.
Figure 10B:
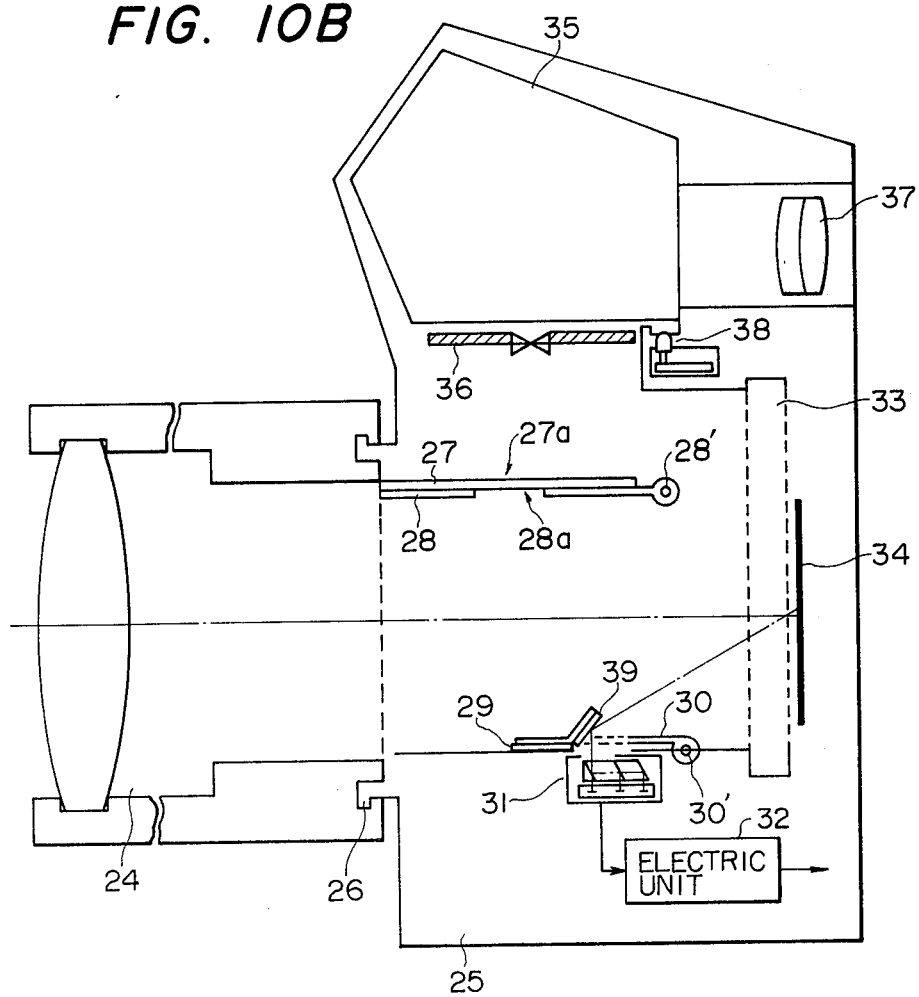

Referring to FIGS. 10A and 10B, a usual picture-taking lens 24 is mounted on a lens mount 26 formed at a part of a camera main body 25. A quick return mirror 27 comprises a semi-transmittal mirror having a suitable transmission factor over a part or the entirety thereof. The quick return mirror 27 is supported by a mirror support 28 which pivots about a shaft 28'. An opening 28a is formed in the support 28 for allowing part of the incident light to be transmitted therethrough. A submirror 29 serves to deflect the transmitted light downward and is supported by a support 30 which pivots about a shaft 30'. A light-receiving unit 31 comprises an optical splitter system and light-receiving elements housed in a single casing. The quick return mirror 27 and the submirror 29 are withdrawn from the optical path for picture-taking in synchronism with the operation of a shutter release button for exposure of a photosensitive member or a film. An electric unit 32 includes a circuit for generating an indication signal and a processing circuit shown in FIG. 2 for processing image signals from the light-receiving unit 31. The light-receiving unit 31 and the electric unit 32 may be arranged integrally. A focal plane shutter 33 of a known construction has a first shutter curtain and a second shutter curtain. Denoted by 34 is a film 34; 35, a pentaprism; 36, a focusing plate; and 37, an objective lens. A display unit 38 is arranged below the pentaprism 35 so as to allow display at part of the finder the focusing state and the results of detection of the picture-taking operation. The display unit 38 is connected to the electric unit 32 through a wire (not shown).

A small mirror 39 is fixed to part of the support 30 in the manner as shown in FIG. 10(B). When the quick return mirror 27 and the submittor 29 are withdrawn from the optical path during exposure of the film 34, the small mirror 39 reflects the light, reflected by the film 34, toward the light-receiving unit 31. In this manner, during exposure of the film 34, the light-receiving unit 31 receives the light reflection by the film 34 so that control or detection of the picture-taking operation can be performed.

Figure 11:
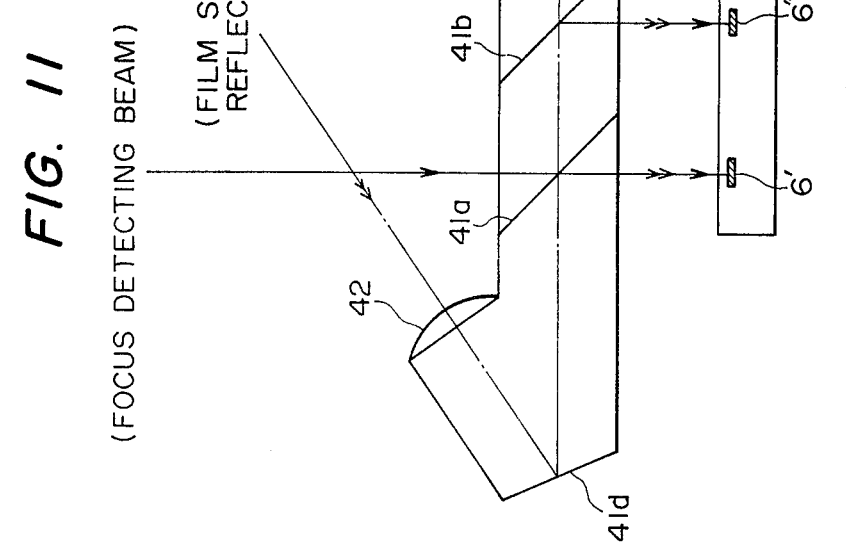
FIG. 11 is a view showing another example of an optical system for guiding the focus detecting light beam and the light beam reflected by a photosensitive member (film surface reflected light) to each light-receiving section of the photoelectric transducer element.

FIG. 11 shows another embodiment of an optical system for guiding the light reflected by the film 34 to the light-receiving unit 31, by means of a prism 41 having semi-transmittal surfaces 41a and 41b, reflecting surfaces 41c and 41d, and a light-receiving lens 42. Normally, the light beam from the object becomes incident on each of the light-receiving sections 6', 6" and 6''' of the photoelectric transducer 6 through the semi-transmittal surfaces 41a and 41b and the reflecting surface 41c to perform the focus detection. However, during exposure of the film 34, the light reflected by the film 34 is guided to the respective light-receiving sections 6', 6" and 6''' along the optical path of the light-receiving lens 42 and the reflecting surface 41d. With this arrangement, since the light-receiving lens 42 is always oriented toward the shutter 33, any stray light which is undesirable for the focus detection may not be guided to the light-receiving sections.

Figure 24:
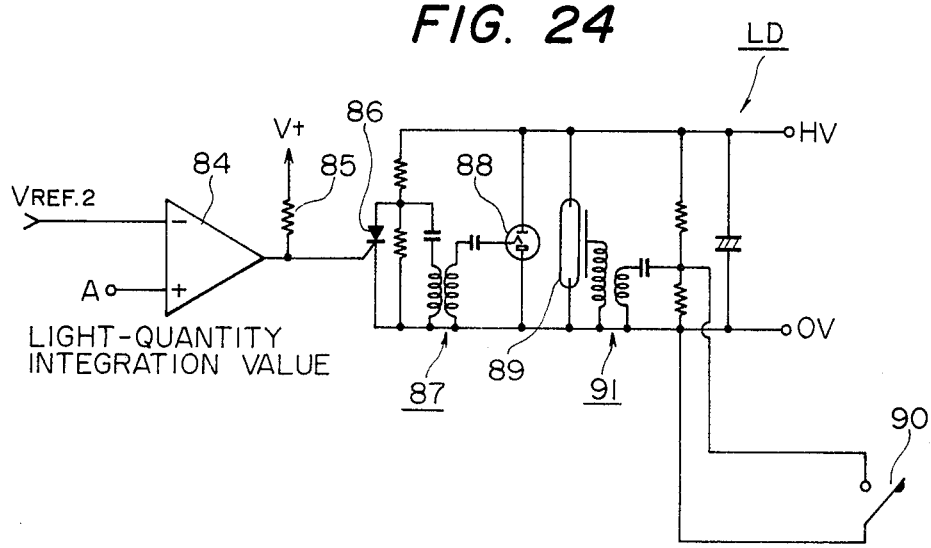
FIG. 24 is a partial circuit diagram showing an example of the automatic light control circuit of the fourth embodiment.

In the embodiments of the present invention, various functions are ensured. For example, in the first embodiment, the detection of exposure of the film 34 and detection of whether the exposure is correct are permitted by using the output from the photoelectric transducer 6 with respect to the light reflected from the film 34 through the mirror 39 and the lens 42 upon exposure of the film 34. In the second embodiment, the exposure can be controlled. In the third embodiment, the confirmation of light emission of the flash device and detection of whether the quantity of emitted light is correct are permitted during the flash picture-taking mode. In the fourth embodiment, the quantity of light to be emitted from the flash device can be controlled. In order to assure the above, an operation command signal SW is supplied to the photoelectric transducer 6 in association with the picture-taking operation. In response to the signal SW, the photoelectric transducer 6 supplies an output to a circuit LC (i.e., a film-surface-reflected-light detecting circuit in the first, third and fourth embodiments: while an exposure control circuit in the second embodiment). A load LD is controlled by the output signal from the circuit LC. That is, it corresponds to a display circuit in the first and third embodiments (FIGS. 12 and 21), the shutter 33 in the second embodiment, and a light emission stop circuit in the fourth embodiment (FIG. 24).

Figure 12:
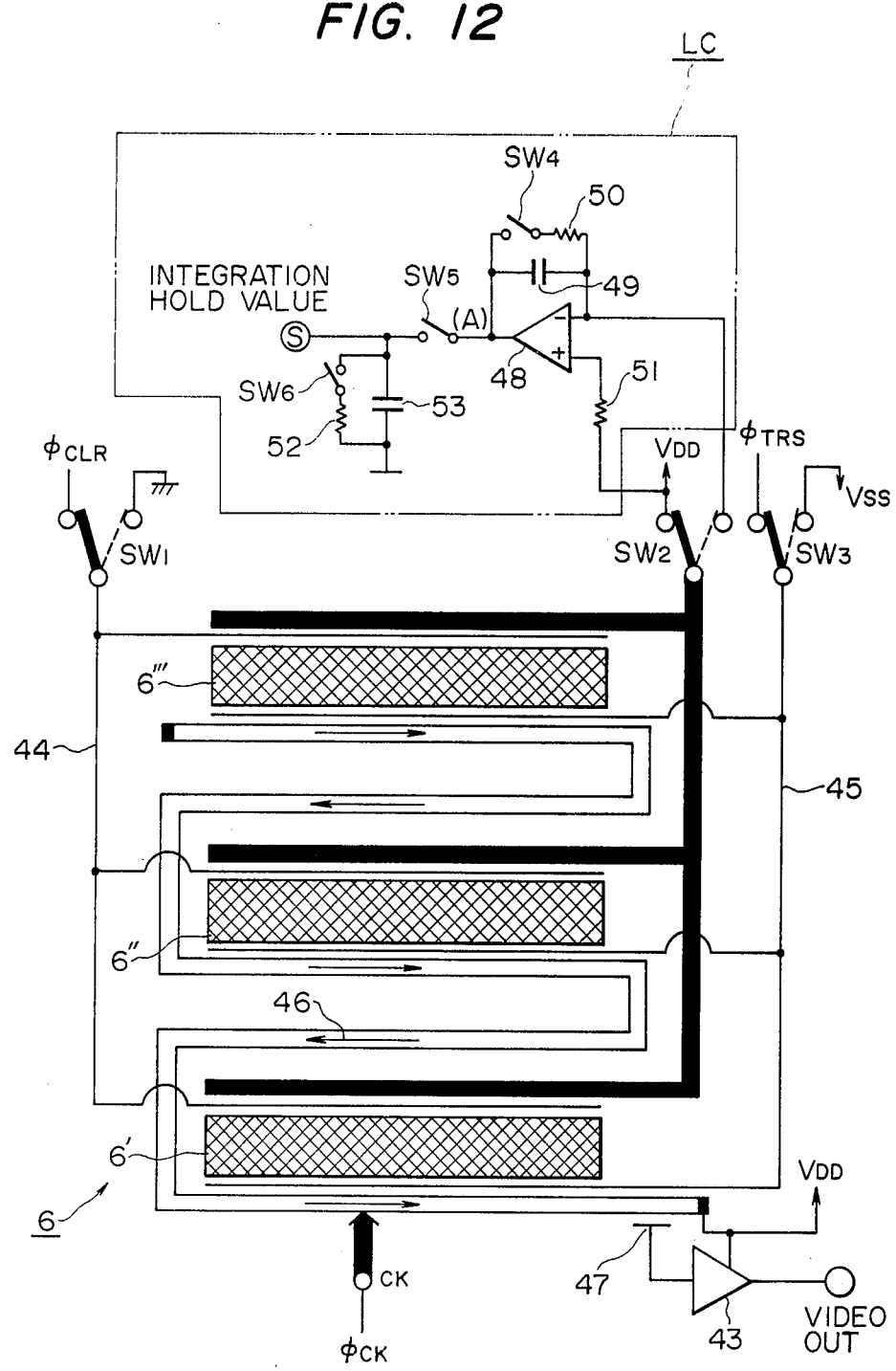
FIG. 12 is a view showing the configuration of a photoelectric transducer (CCD) in the first and third embodiments of the present invention.

These embodiments will now be described in sequential order. Referring to FIG. 12, the photoelectric transducer 6 comprises a charge-transfer type solid image pickup element. Switches SW1 to SW6 are shown in the focus detection mode. The present invention is not limited to the use of a charge-transfer type solid image pickup element and may be extended to the use of a MOS image sensor or the like. Each light-receiving section 6', 6" and 6''' comprise a group of a plurality of small photoelectric transducer elements and have a known charge accumulating function. These light-receiving sections 6', 6" and 6''' are formed monolithically on a single silicon chip together with the other parts to be described below.

Each photoelectric transducer element has a size of $30 \times 50\mu$. Although the number of elements in each group is not particularly limited, it is 100 to 200, for example. An accumulation clear gate (overflow drain gate) 44 is for discharging to the level of the overflow drain voltage VD any unnecessary charges stored in each element, prior to accumulation of the signal charges. The accumulation clear gate 44 is operated in response to a clear pulse $\phi_{CLR}$ supplied to one end thereof. When the accumulation clear gate 44 is opened for a predetermined period of time and unnecessary charges are discharged, the gate 44 is closed so that the signal charge accumulation in the light-receiving sections 6', 6" and 6''' is initiated in accordance with the light signals. After charge accumulation for a predetermined period of time, a charge transfer gate 45 transfers the accumulated charges to an analog shift register 46 such as a CCD of a serpentine structure. The charge transfer gate 45 is operated in response to a transfer pulse $\phi_{TRS}$. The signal charge of each photoelectric transducer element which has been transferred to the analog shift register 46 is transferred as shown by arrows in the figure in response to a clock pulse $\phi_{CK}$. The transferred charge is converted into a voltage by a floating gate 47 and is output through an amplifier 43 to which a voltage $V_{DD}$ is supplied. The charge which passes through the floating gate 47 is discharged to a potential of $V_{DD}$.

When the charge transfer gate 45 is closed, the accumulation clear gate 44 is opened and then is closed after a predetermined period of time. Thus, the charges begin to be accumulated. After another predetermined period of time, the charge transfer gate 45 operates to transfer the charges accumulated in the light-receiving sections 6', 6" and 6''' to the analog shift register 46. By the repetition of this cycle, image signals of each group of photoelectric transducer elements are cyclically output to the output end.

Figure 13:
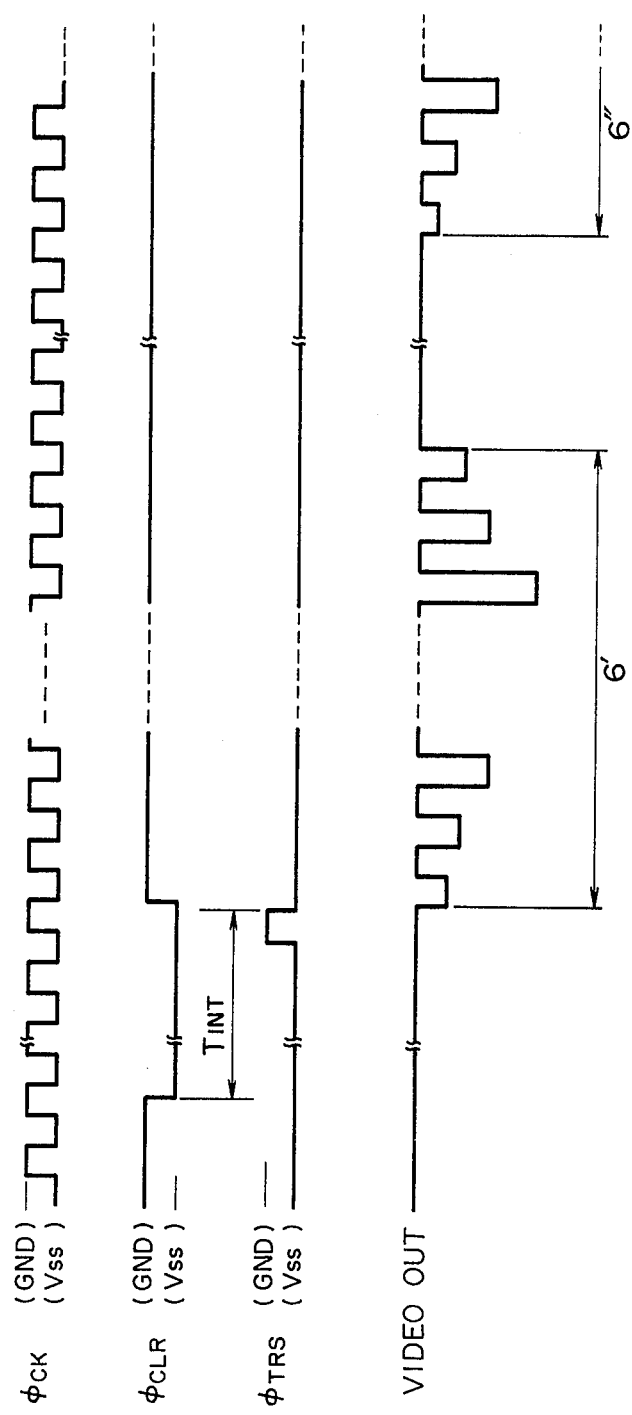
FIG. 13 is a timing chart of various signals supplied to and put out from the photoelectric transducer shown in FIGS. 12 and 17.

FIG. 13 is a timing chart of the various clock pulses described above and the image signal (video signal) during one scanning period. The pulse $\phi_{CK}$ is constantly supplied. The pulse $\phi_{CLR}$ is turned off at a certain timing and a pulse $\phi_{TRS}$ is supplied at the trailing edge of the pulse $\phi_{CLR}$. Thus, the charge accumulating time is defined by a time interval $T_{INT}$ from the falling point of the pulse $\phi_{CLR}$ to the falling point of the pulse $\phi_{TRS}$. The image signal from the light-receiving section 6' is output immediately after the pulse $\phi_{TRS}$ goes low level. This image signal is represented by video in the figure. When readout of the image signal from the light-receiving section 6' is completed, the image signal from the next light-receiving section 6" is then read out after a no-signal period the duration of which is determined by the length of the analog shift register (CCD). When readout of the image signal from the light-receiving section 6" is completed, readout of the image signal form the light-receiving section 6''' is then initiated after another no-signal period. In this manner, readout of three image signals is completed. This cycle is repeated to sequentially output the image signals. The length of each scanning period is dependent upon the length of the time interval $T_{INT}$.

In this manner, the image signals of an image are time-serially read out and are subjected to the signal processing as described with reference to FIG. 2. Thereafter, focus detection is performed and then film exposure is performed. The exposure confirmation in the first embodiment of the present invention will now be described with reference to FIGS. 12 and 14.

When the shutter 33 is released at a timing shown in FIG. 14(a), a movement signal of first shutter curtain is generated after a time delay of several tens of microseconds as shown in FIG. 10(b) in association with the movement of the first curtain of the shutter 33. After a predetermined exposure time, a movement signal of second shutter curtain as shown in FIG. 10(c) is generated in association with the movement of the second shutter curtain of the shutter 33. The duration T between these two signals is the time during which the shutter is opened. At the timing at which the movement signal of first shutter signal is generated, the accumulation clear gate 44, the charge transfer gate 45, and the switches SW1, SW2 and SW3 at $V_{DD}$ are switched to the positions indicated by the broken lines in FIG. 12 to change the modes to perform exposure detection. This is shown in FIG. 14(e). These parts return to their original positions indicated by solid lines at the timing at which the movement signal of second shutter curtain is generated to change the modes to perform focus detection. When the exposure detection mode is set, the charges corresponding to the quantity of light incident on the light-receiving sections 6', 6" and 6''' cannot be transferred to the analog shift register 46. Since the potential barrier of the accumulation clear gate 44 is low, the charges will flow to the inverting input end of an amplifier 48. When under such conditions the switch SW4 is opened as shown in FIG. 14(f), the charges corresponding to the amount of exposure are supplied to this inverting input end. The switch SW4 is normally closed to keep a capacitor 49 short-circuited. The switch SW5 is normally opened, while the switch SW6 is normally closed. Thus, a capacitor 53 is normally kept short-circuited. When the film 34 is exposed to the light, the switch SW4 is opened. Thus, an integration output A from the amplifier 48 changes as shown in FIG. 14(g). Referring to FIG. 14(g), a signal of waveform (II) corresponds to the case wherein optimal exposure is performed. A signal of a waveform (III) corresponds to the case of an overexposure wherein intense light is incident. A signal of waveform (I) corresponds to the case of an underexposure wherein the object has extremely low luminance or the first and second shutter curtains do not work properly to cause a so-called "closed curtain" phenomenon. Thus, such an integration output A that corresponds to the condition is generated at the output end of the amplifier 48. At a timing slightly delayed from the generation of the movement signal of second shutter curtain, the switch SW5 is closed while the switch SW6 is opened (FIGS. 14(h) and (i)). Therefore, such a value that corresponds to the final potential of the integration output A is held as the integration-hold value, as shown in FIG. 14(j), until, e.g., a next film winding signal shown in FIG. 14(d) is supplied. The exposure detection is performed through discrimination of the magnitude of the integration-hold value S. Specifically, if the integration-hold value S exceeds a predetermined value, an overexposure is detected. If the integration-hold value S is below another predetermined value, an underexposure is detected. When the integration-hold value S is within a range between these two predetermined values, an optimal exposure is detected. The exposure detection mode such as holding of the integration value A is cleared and the focus detection mode is restored in response to the next film winding signal shown in FIG. 14(d). A protective resistor 51, and resistors 50 and 52 for determining the discharging time constants of the capacitors 49 and 53 are also incorporated in the arrangement shown in FIG. 12.

The opening/closing operations of the switches SW1 to SW6 may be controlled in association with the camera mechanism (winding mechanism or the like) as well as the shutter 33 so as to achieve the timings of FIG. 14.

Figure 15:
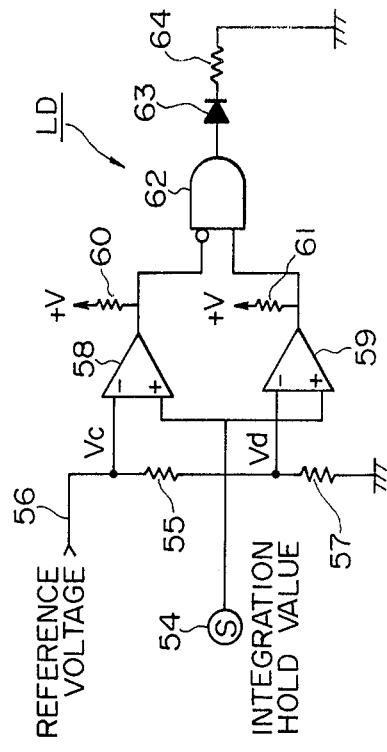
FIG. 15 is a partial circuit diagram showing an example of the exposure detection and indication circuit of the first embodiment.

FIG. 15 shows an example of the circuit LD in FIG. 2 for indicating the exposure detection. The integration-hold value S described above is supplied through a terminal 54. Resistors 55 and 57 and comparators 58 and 59 constitute a window comparator. Pull-up resistors 60 and 61 are connected to a power source V+. A reference voltage is supplied to a terminal 56. If the reference input voltages of the respective comparators determined by the resistors 55 and 57 are represented by Vc and Vd (where Vc > Vd), the outputs from the comparators 58 and 59 go high level if the integration hold value S is higher than Vc. Then, the output from an AND gate 62 goes low level. If the integration hold value S is within a range of Vc and Vd, the output from the comparator 58 goes low level while the output from the comparator 59 goes high level. Then, an LED 63 is lit indicating the optimal exposure. If the integration hold value S is not greater than Vd, the outputs from the comparators 58 and 59 both go low level, and the output from the AND gate 62 goes low level. In this manner, in the case of optimal exposure, the LED 63 is lit, while in the case of an overexposure or underexposure, the LED 63 is not lit, allowing confirmation of the exposure condition. A resistor 64 is for limiting the current.

Figure 16:
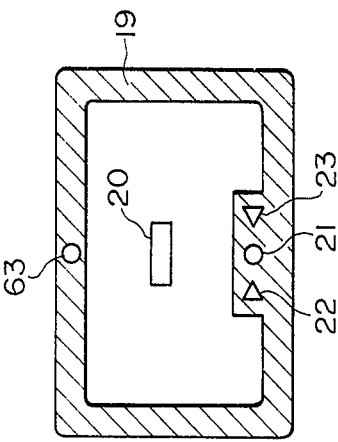
FIG. 16 is a view showing an example of signal indication within the finder of a camera of the first embodiment, when both the results of focus detection and exposure detection are to be indicated.

The LED 63 is arranged at part of the camera or within the view finder. When the LED 63 is placed within the view finder, it may be placed at the center of the upper part of the finder, separately from the LED for indicating the focusing state, as shown in FIG. 16.

In this manner, according to the first embodiment, confirmation of exposure and detection of whether the exposure is correct are performed by utilizing the focus detecting device, that is, the photoelectric transducer for focus detection, and by changing the modes of operation of the circuitry. For this reason, separate light-receiving sections need not be incorporated for this purpose. Furthermore, by utilizing the light reflected by the film surface, reliability of exposure detection becomes extremely high.

Figure 17:
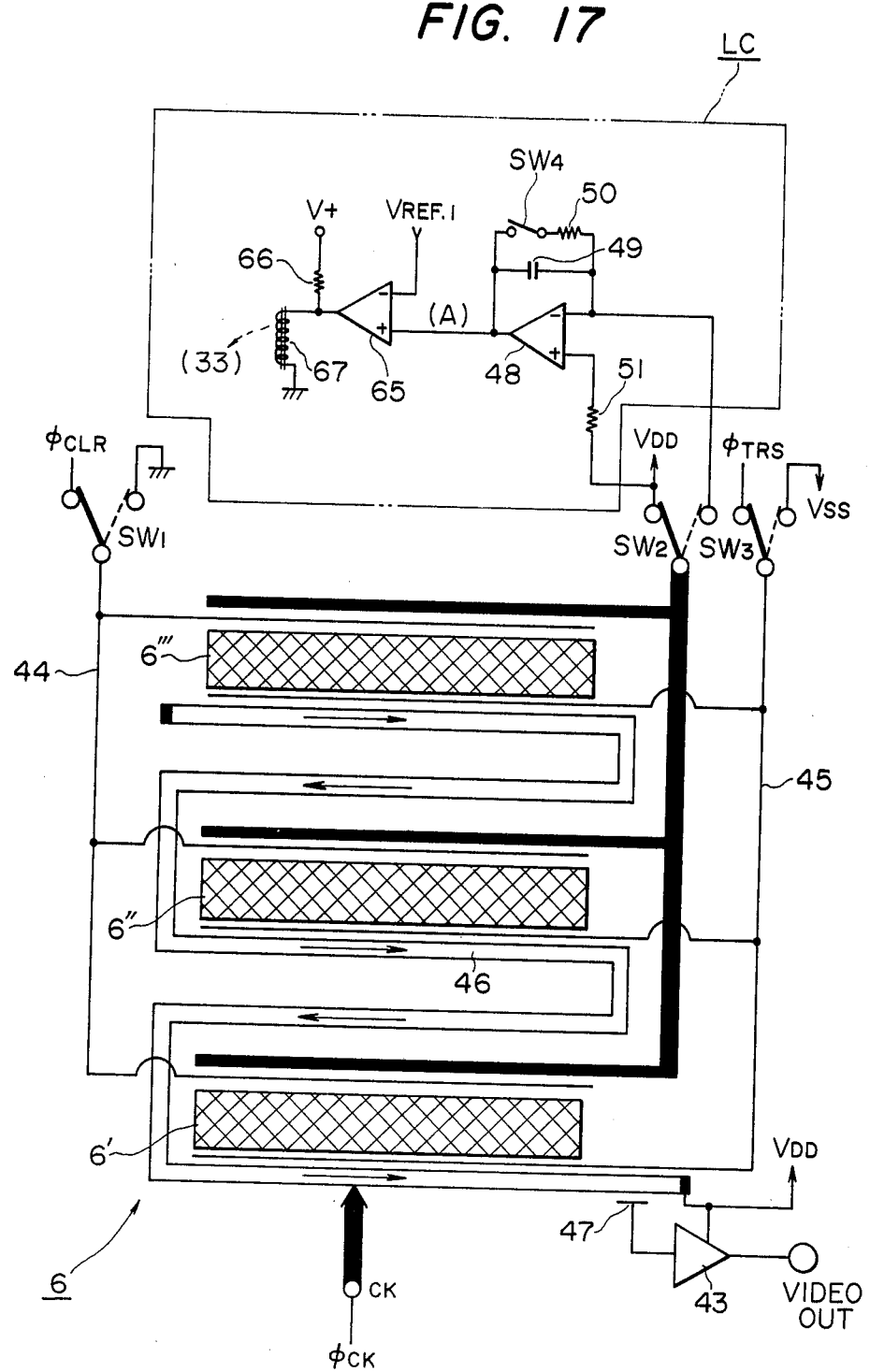
FIG. 17 is a view showing the configuration of an example of the photoelectric transducer (CCD) and an exposure control circuit in the second embodiment according to the present invention.
Figure 18:
FIG. 18 is a timing chart of various control signals supplied to the photoelectric transducer and the exposure control circuit shown in FIG. 17 and the signal showing the quantity of light incident on the film, in the exposure control mode.

The exposure control according to the second embodiment of the present invention will now be described with reference to FIGS. 17 and 18. Referring to FIG. 17, the same reference numerals as in FIG. 12 denote the same parts in the first embodiment shown in FIG. 12. FIG. 18 generally corresponds to FIG. 14.

When the shutter is released at a timing shown in FIG. 18(a), a movement signal of first shutter curtain is generated after a time delay of several tens of microseconds as shown in FIG. 18(b). After a predetermined exposure time, a movement signal of second shutter curtain as shown in FIG. 18(c) is generated. The interval between these two timings is the time interval during which the shutter is opened. At the timing at which the movement signal of first shutter curtain is generated, the accumulation clear gate 44, the charge transfer gate 45, and the switches SW1, SW2 and SW3 at $V_{DD}$ are switches to the positions indicated by the broken lines in FIG. 17 in response to the operation command signal SW. Thus, the exposure control mode is set. These switches SW1, SW2 and SW3 are returned to the positions indicated by the solid lines at the timing at which the movement signal of second shutter curtain goes low level to set the focus detection mode. When the exposure control mode is set, the charges corresponding to the quantity of light incident on the light-receiving sections 6', 4" and 6''' cannot be transferred to the analog shift register 46, and are supplied to the inverting input end of the amplifier 48 through the switch SW2 since the potential barrier of the accumulation clear gate is low. The switch SW4 serves to short-circuit the capacitor 49 and is normally closed. As shown in FIG. 18(f), the switch SW4 is opened in synchronism with the switches SW1 to SW3. Since a photoelectric input is received under such conditions through the switch SW2, the light-quantity integration value A is obtained at the output end of the amplifier 48. This is shown by the solid line in FIG. 18(g). When the light-quantity integration value A gradually increases to reach a voltave $V_{REF1}$, the comparator 65 is inverted to generate a movement signal of second shutter curtain. Then, a magnet 67 is energized to cause the movement of the second shutter curtain, whereby the shutter is closed. The movement command pulse to secnd shutter curtain is shown in FIG. 18(h). The arrangement shown in FIG. 17 includes a pull-up resistor 66, annd fixed resistors 50 and 51. If the light-quantity integration value A as indicated by the broken line as shown in FIG 18(g) abruptly increases for some reason when the shutter is being open, the light-quantity integration value A exceeds the voltage $V_{REF1}$ before a predetermined exposure time expires. At the point at which the value A exceeds $V_{REF1}$, the movement signal of second shutter curtain indicated by the broken line in FIG. 18(h) is generated to move the second shutter curtain to close the shutter before the predetermined exposure time elapses. In this manner, an overexposure is prevented, resulting in optimal exposure.

According to the second embodiment of the present invention, exposure control is performed by utilizing the focus detecting device, that is, the focus detecting photoelectric transducer, and by changing the operating modes. Therefore, separate light-receiving elements need not be used. By utilizing the light reflected by the film surface, the reliability of the exposure control is extremely improved. Even if the light-quantity integration value abruptly increases during a longer exposure time, optimal exposure control can be performed in correspondence with such an increase.

Figure 19:
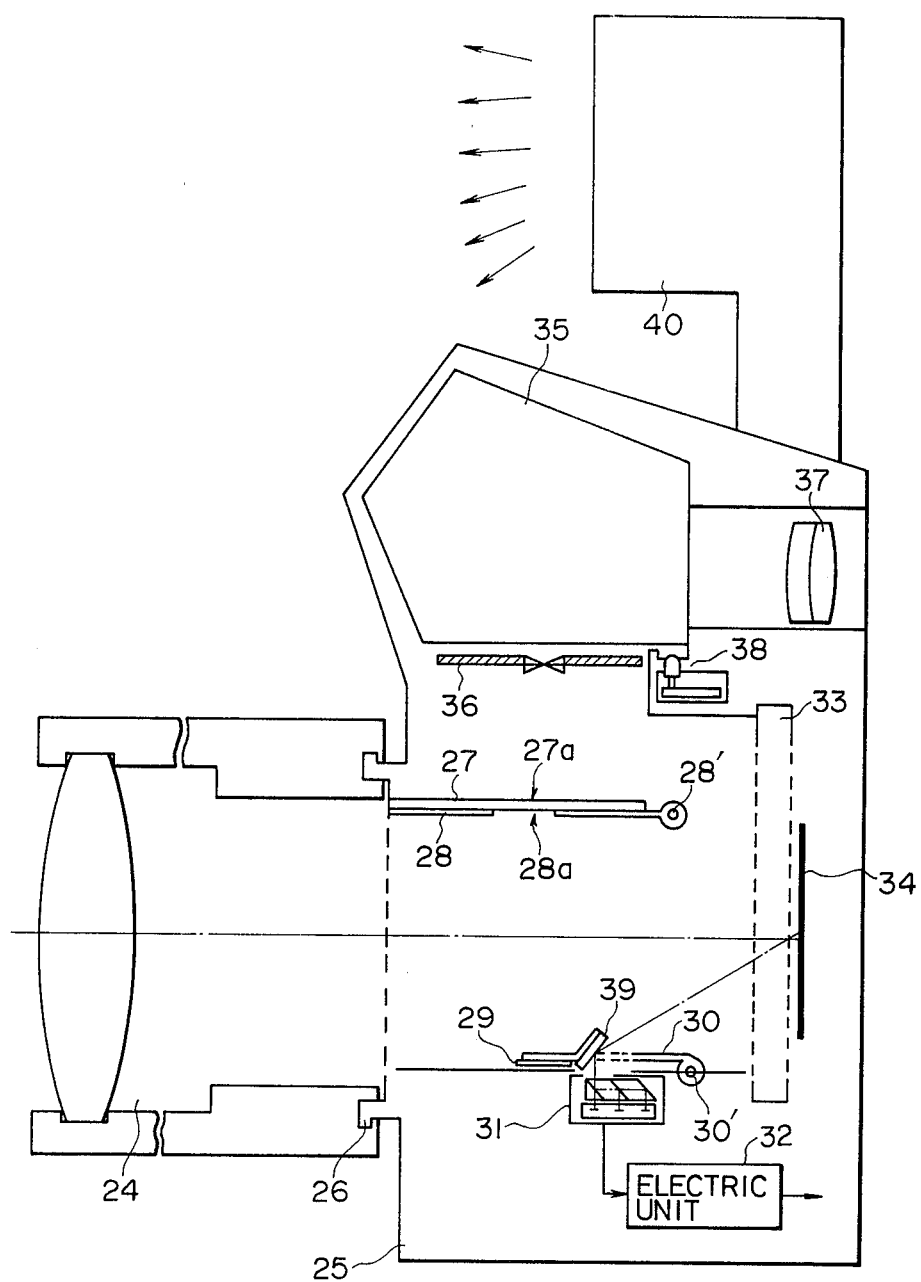
FIG. 19 is a view schematically showing the flash picture-taking mode in the single lens reflex camera shown in FIG. 10.

The third and fourth embodiments of the present invention will not be described. In these embodiments, flash picture-taking is performed with the use of a flash device 40 as shown in FIG. 19. The same reference numerals as those in FIGS. 10A and 10B denote the same parts as in FIG. 19.

The confirmation of light emission and the detection of whether the quantity of emitted light is appropriate according to the third embodiment of the present invention will be described. The CCD 6 and the circuit LC in the third embodiment are of the same configuration as that of the first embodiment shown in FIG. 12.

The third embodiment differs from the first embodiment in that switches SW4 to SW6 are controlled in association with a flash trigger pulse supplied to the flash device 40. As will be described later, the switch SW4 is normally closed, for example, and is opened for a predetermined time, corresponding to the light emitting time of the flash device 40, in response to the flash trigger pulse. The switch SW5 is temporarily closed slightly before the switch SW4 is closed. The switch SW6 is opened in synchronism with the closing operation of the switch SW5 and then is closed by the resetting operation associated with the film winding operation. Although the detailed arrangement for this is not shown, these switches can be electrically or mechanically controlled to operate in the manner described above.

Figure 20:
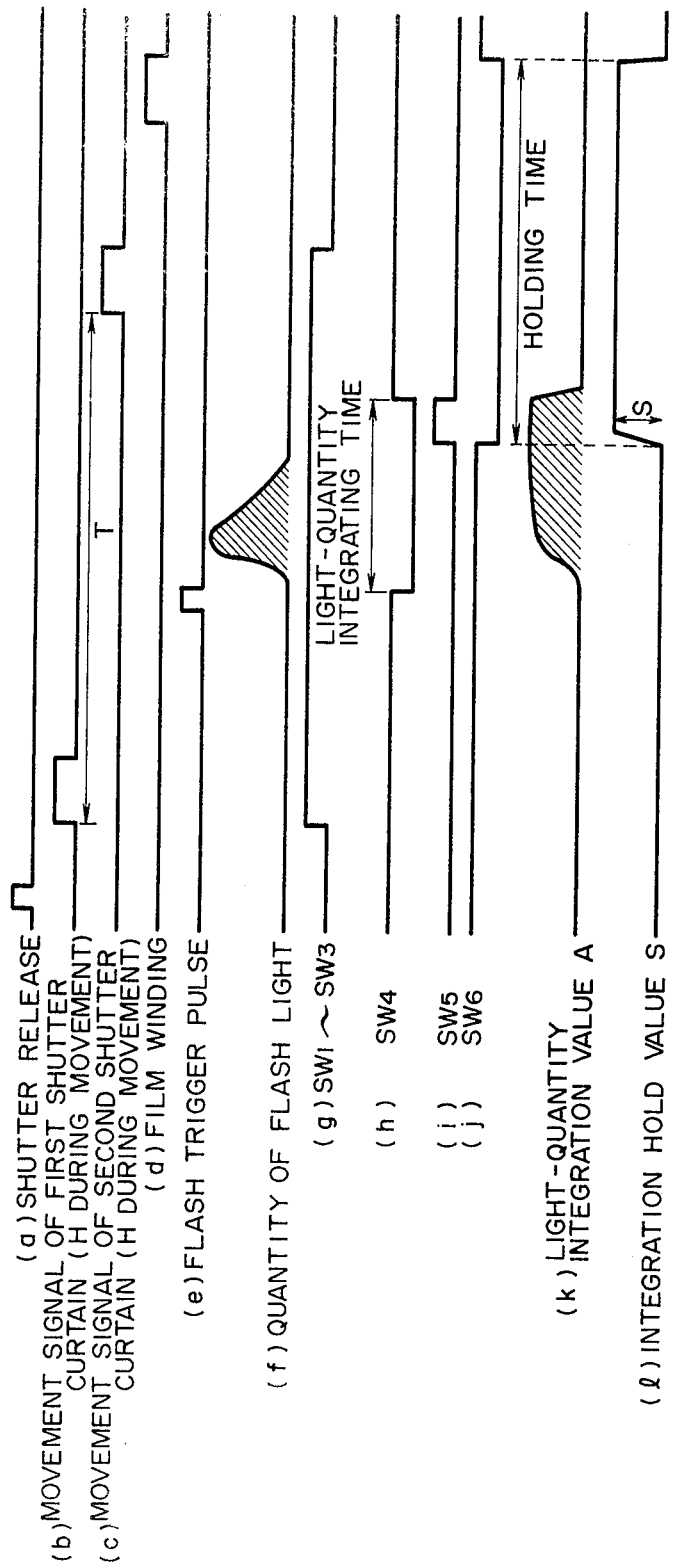
FIG. 20 is a timing chart of various control signals supplied to the photoelectric transducer and the circuit for detecting the reflected light from the photosensitive member, shown in FIG. 12, and the signal showing the quantity of light received by the photosensitive member (the quantity of light incident on the film), in the light control mode in the third embodiment.

Referring to FIG. 20, when the shutter is released at a timing shown in FIG. 20(a), a movement signal of first shutter curtain is generated with a delay of, e.g., several tens of microseconds as shown in FIG. 20(b). After a predetermined exposure time, a movement signal of second shutter curtain as shown in FIG. 20(c) is generated. The interval T is the time during which the shutter is opened. At the timing at which the movement signal of first shutter curtain is generated, the accumulation clear gate 44 of the CCD 6, the charge transfer gate 45, and the switches SW1, SW2 and SW3 at $V_{DD}$ are switched to the positions indicated by the broken lines. Thus, the light control confirmation mode is set. At the timing at which the movement signal of second shutter curtain goes low level, these parts return to the positions indicated by the solid lines shown in FIG. 12 to set the focus detection mode described above. When the light control confirmation mode is set, the charges corresponding to the quantity of light incident on the light-receiving sections 6', 6" and 6''' of the CCD6 cannot be transferred to the analog shift register 46. Since the potential barrier of the accumulation clear gate 44 is low, the charges will be supplied to the inverting input end of the amplifier 48 through the switch SW2. Under such conditions, when a flash trigger pulse as shown in FIG. 20(e) is generated, and the flash device flashes as shown in FIG. 20(f), charges corresponding to the quantity of emitted light are supplied to the inverting input end of the amplifier 48. The switch SW4 is normally closed to short-circuit the capacitor 49. The switch SW5 is normally opened, while the switch SW6 is normally closed to short-circuit the capacitor 53. When the flash trigger pulse is generated, these switches SW4, SW5 and SW6 are opened, closed, and opened, respectively. This is shown in FIGS. 20(h), (i) and (j). With this arrangement, the potential at the output end of the amplifier 48 changes as shown in FIG.

20(k) according to the charges integrated by the capacitor 49. The charge is transferred to the capacitor 53 at the timing at which the switch SW5 is closed. At this movement, the switch SW6 is opened whereby the light-quantity integration value A is held as shown in FIG. 20(l). The value so held is represented by S. The confirmation of light control, including the detection of whether the light quantity is appropriate, is performed by discrimination of the magnitude of the integration hold value S. When the integration hold value S exceeds a predetermined value, the light quantity is excessive. On the other hand, if the integration hold value S is below another predetermined value, the light quantity is too small. When the integration hold value S is within the range between these predetermined values, it is confirmed that the exposure with an appropriate quantity of light has been performed. The light control confirmation mode such as by holding the integration value S is cleared by, e.g., a next film winding signal as shown in FIG. 20(d). Then, the focus detection mode is restored.

Figure 21:
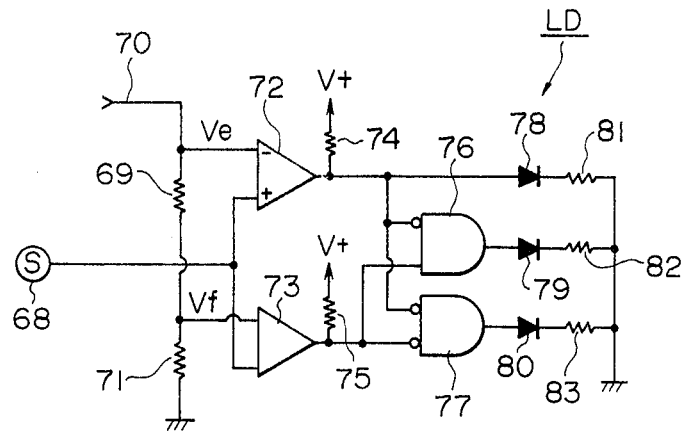
FIG. 21 is a partial circuit diagram showing an example of an indication circuit for indicating the confirmation of the light control in the third embodiment.

FIG. 21 is a circuit diagram of the circuit LD shown in FIG. 2, for indicating the confirmation of light control. Referring to FIG. 21, the integration hold value S is input from a terminal 68, resistors 69 and 71 and comparators 72 and 73 constitute a window comparator. Pull-up resistors 74 and 75 are connected to the power source V+. A reference potential is applied to a terminal 70. If the reference input voltages supplied to the comparators 72 and 73 which are determined by the resistors 69 and 71 are represented by Ve and Vf (wherein Ve > Vf), an LED 78 alone is lit in response to the output of high level from the comparator 72 if the integration hold value S is higher than Ve. Thus, the excess of light-quantity is indicated. If the integration hold value S is within a range of Ve and Vf, the output of the comparator 72 goes low level, while the output from the comparator 73 goes high level. Therefore, the output from an AND gate 76 goes high level and an LED 79 alone is lit, indicating that the light-quantity is appropriate. If the integration hold value S is below Vf, the outputs from both the comparators 72 and 73 go low level. Then, the output fron an AND gate 77 alone goes high level. Then, an LED 80 alone is lit to indicate the lack of light-quantity. Resistors 81, 82 and 83 serve to limit the currents. The LEDs 78, 79 and 80 are arranged at part of the camera or within the view finder. If they are placed within the view finder, these LEDs may be used commonly for indicating the focusing state. In such case, it is easy to arrange these LEDs so as to be operated in response to the signals, described with reference to the third embodiment, during the light control confirmation mode.

According to the third embodiment of the present invention, as described above, the confirmation of light control of the flash device is performed by utilizing the focus detecting device, that is by switching the modes of operation of the photoelectric transducer for focus detection. Therefore, separate light-receiving elements need not be used. By performing the confirmation with the use of the light reflected from the film surface, the reliability thereof is significantly improved.

As will be seen from the above description, the confirmation of operation of the flash device 40 may be performed as well by comparing the integration hold value S with a predetermined level ($<Vf$).

Figure 22:
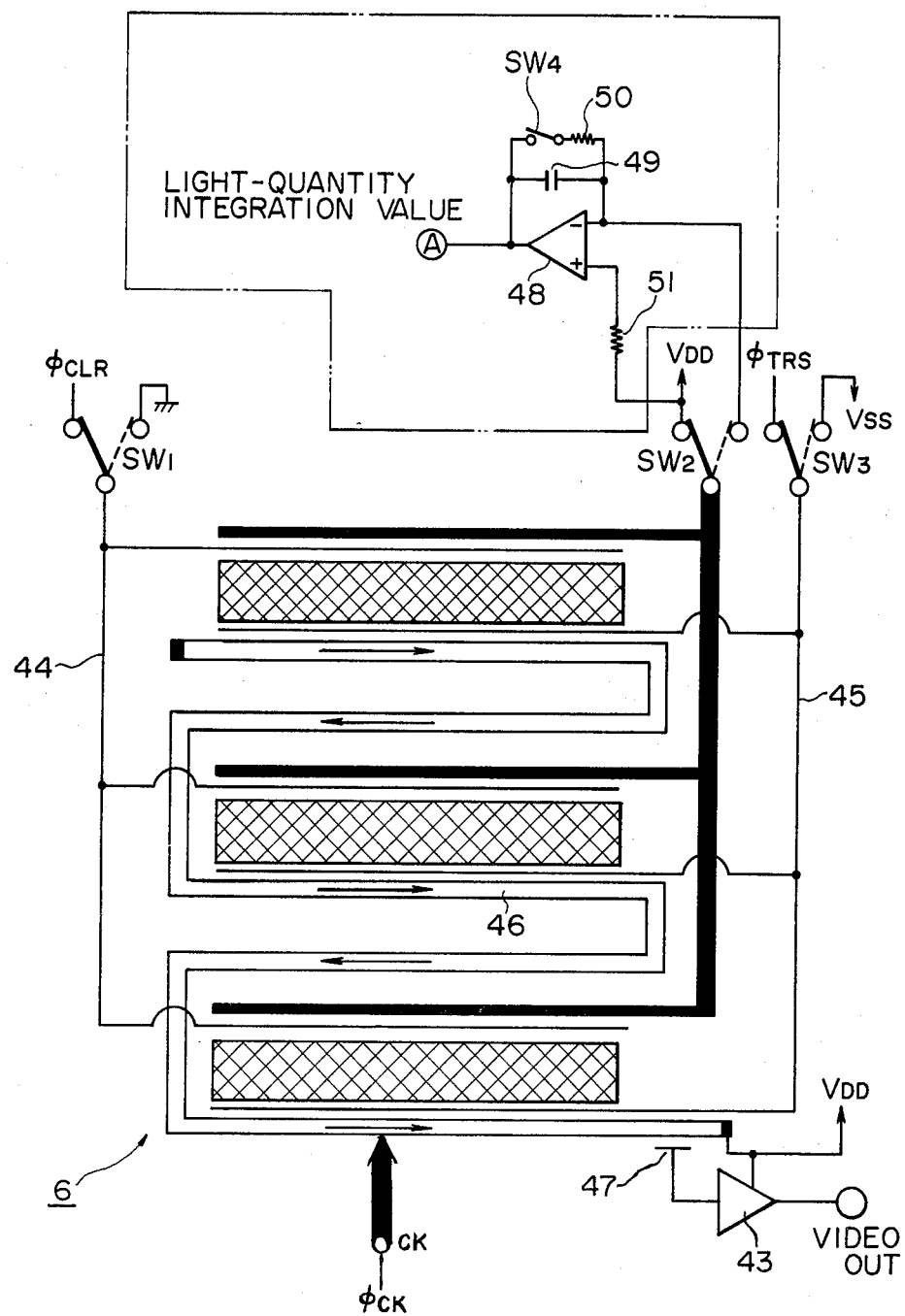
FIG. 22 is a view showing the configuration of an example of the photoelectric transducer and the circuit for detecting the reflected light from the photosensitive member, in the fourth embodiment of the present invention.

Automatic control of the quantity of light to be emitted by the flash device according to the fourth embodiment of the present invention will now be described with reference to FIGS. 22 to 24. The reference numerals in FIG. 22 same as those in FIGS. 12 and 17 denote the same parts in FIGS. 12 and 17. Especially, the switch SW4 operates in the same manner as in the third embodiment.

As in the case of earlier embodiments, when the shutter is released at a timing shown in FIG. 23(a), a movement signal of first shutter curtain is generated after a time delay of, e.g., several tens of microseconds as shown in FIG. 23(b). Then, after a predetermined exposure time elapses, a movement signal of second shutter curtain as shown in FIG. 23(c) is generated. The interval between these two timings is the time during which the shutter is opened. At the timing at which the movement signal of first shutter curtain is generated, the accumulation clear gate 44 of the CCD 6, the charge transfer gate 45, and the switches SW1, SW2 and SW3 at $V_{DD}$ are switched to the positions indicated by the broken lines shown in FIG. 22. Thus, the automatic light control mode is set. This is shown in FIG. 23(g). These parts will return to the positions indicated by the solid lines at the timing at which the movement signal of second shutter curtain goes low level, thereby setting the focus detecting mode. When the automatic light control mode is set, the charges corresponding to the quantity of light incident on the light-receiving sections 6′, 6″ and 6‴ cannot be transferred to the analog shift register 46. Since the potential barrier of the accumulation clear gate 44 is low, the charges are supplied to the inverting input end of the amplifier 48 through the switch SW2. Under such conditions, when a flash trigger pulse is generated as shown in FIG. 23(e), and the flash device 40 emits light as shown in FIG. 23(f), the charges corresponding to the quantity of incident light are supplied to the inverting input end of the amplifier 48. The switch SW4 is normally closed to short-circuit the capacitor 49. The switch SW4 is opened in association with the flash trigger pulse as shown in FIG. 23(h). With this arrangement, the potential at the output end of the amplifier 48 changes as shown in FIG. 23(i) according to the charges integrated by the capacitor 49. When the potential at the output end of the amplifier 48, that is, the light-quantity integration value A reaches a predetermined voltage "$V_{REF2}$", a comparator 84 shown in FIG. 24 is inverted to render a SCR 86 conductive. Then, a light emission stop circuit 87 including a bypass tube 88, of known type, is operated to immediately stop the light emission of the flash device. The output from the comparator 84 is shown in FIG. 23(j). FIG. 23(d) shows a film winding signal. When this signal is generated, the automatic light control mode as described above is reset, and the focus detection mode is restored.

The arrangement shown in FIG. 24 includes a pull-up resistor 85, a Xe discharge lamp 89, a switch 90 for generating a flash trigger pulse shown in FIG. 23(e), and a flash trigger circuit 91. The switch 90 may comprise known X contacts.

In summary, according to the fourth embodiment of the present invention, automatic light control is performed by utilizing the focus detecting device, that is, the photoelectric transducer for focus detection, and by changing its operating modes. Therefore, separate light-receiving elements need not be incorporated for the purpose of automatic light control. By performing the light control with the use of the light reflected from the film surface, the light control can be performed with high reliability.

What is claimed is:

1. A camera comprising:
   (A) a focus-adjustable objective lens;
   (B) means for exposing a photosensitive member to light from said objective lens;
   (C) a system for detecting the focusing state of said objective lens, said system including means for converting light into an electric signal;
   (D) optical means for directing the light reflected from said photosensitive member toward said converting means upon exposure of said photosensitive member to the light by said exposing means; and
   (E) circuit means for producing an output associated with exposure of said photosensitive member in response to an output of said converting means with respect to the light reflected from said photosensitive member.

2. A camera according to claim 1, wherein said circuit means includes an exposure confirmation circuit for confirming whether said photosensitive member is properly exposed to the light from said objective lens, on the basis of the output from said converting means.

3. A camera according to claim 2, wherein said exposure confirmation circuit includes means for discriminating whether the amount of exposure of said photosensitive member is appropriate.

4. A camera according to claim 2 or 3, further comprising means for indicating an output from said exposure confirmation circuit.

5. A camera according to claim 1, wherein said circuit means includes a detecting circuit for detecting the amount of exposure of said photosensitive member on the basis of the output from said photoelectric converting means, and an exposure control circuit for controlling the amount of exposure of said photosensitive member on the basis of an output from said detecting circuit.

6. A camera according to claim 5, wherein said exposure control circuit controls said exposing means to thereby control the amount of exposure of said photosensitive member.

7. A camera according to claim 6, wherein said exposing means includes shutter means.

8. A camera according to claim 5, wherein the camera is capable of performing flash picture-taking with a flash device, and said exposure control circuit controls the quantity of light to be emitted from the flash device to thereby control the amount of exposure of said photosensitive member.

9. A camera according to claim 1, wherein the camera is capable of performing flash picture-taking with a flash device, and said circuit means includes a light emission confirmation circuit for confirming the light emission of the flash device on the basis of the output from said converting means.

10. A camera according to claim 9, wherein said light emission confirmation circuit includes means for discriminating whether the quantity of light emitted from the flash device is appropriate.

11. A camera according to claim 9 or 10, further comprising means for indicating an output from said light emission confirmation circuit.

12. A camera according to claim 4, wherein the camera has a viewfinder, and said indicating means allows indication of the output from said light emission confirmation circuit within said viewfinder.

13. A camera according to claim 11, wherein said camera has a viewfinder, and said indicating means allows indication of the output from said light emission confirmation circuit within said viewfinder.

14. A camera according to claim 8, 9 or 10, wherein said circuit means includes means for selecting only the output from said converting means within a period corresponding to a light emission period of the flash device.

15. A camera according to anyone of claims 1 to 3 and 5 to 10, wherein said focus detection system includes focus detecting means for performing focus detection on the basis of the output from said converting means, and the camera further includes switching means for selectively supplying, in association with the operation of said exposing means, the output from said converting means to said focus detecting means or to said circuit means.

16. A camera according to claim 15, wherein said converting means includes:
    an array of a plurality of photoelectric conversion elements each generating an electric signals in response to light incident thereon;
    a first output path for serially outputting the electric signals generated by said photoelectric conversion elements; and
    a second output path for outputting, in a parallel manner, the electric signals generated by said photoelectric conversion elements,
    said switching means supplying the electric signals supplied through said first output path to said focus detecting means and supplying the electric signals supplied through said second output path to said circuit means.

17. A camera according to claim 15, wherein said optical means becomes operative with respect to said converting means only during the exposure of said photosensitive member, in association with the operation of said exposing means.

18. A camera according to claim 17, wherein said focus detection system includes means disposed in an optical path of said objective lens during focus detection to direct the light from said objective lens to said converting means to perform focus detection, said directing means being withdrawable from the optical path in association with the operation of said exposing means, and said optical means being operatively connected to said directing means so as to become operative with respect to said converting means when said directing means is withdrawn from the optical path.

19. A camera according to claim 18, wherein said directing means and said optical means comprise reflecting mirrors.

20. A camera comprising:
    (A) means for exposing a photosensitive member to light from an object scene;
    (B) light detecting means;
    (C) first optical means for causing, prior to exposure of said photosensitive member by said exposing means, the light from the object scene to be incident on said light detecting means;
    (D) second optical means for causing, upon exposure of said photosensitive member by said exposing means, the light reflected from said photosensitive member to be incident on said light detecting means; and
    (E) changing-over means for withdrawing said first optical means in association with an exposure operation and moving said second optical means to a position at which said second optical means can direct light reflected from said photosensitive member toward said light detecting means.

21. A camera according to claim 20, further comprising objective lens means for receiving the light from the object scene, said exposing means being arranged to expose said photosensitive member to the light from said objective lens means and said first optical means being arranged to cause the light from said objective lens means to be incident on said light detecting means.

22. A camera according to claim 20 or 21, wherein the camera is capable of performing flash picture-taking with a flash device and further comprises means for controlling the quantity of light to be emitted from the flash device in accordance with a detection output from said light detecting means with respect to the reflected light from said photosensitive member.

23. A camera according to claim 20 or 21, wherein the camera is capable of performing flash picture-taking with a flash device and further comprises means for confirming the light emission of the flash device on the basis of a detection output from said light detecting means with respect to the reflected light from said photosensitive member.

24. A camera according to claim 23, wherein said light emission confirmation means includes means for discriminating whether the quantity of light emitted from the flash device is appropriate.

25. A camera according to claim 24, further comprising means for indicating an output from said light emission confirmation means.

26. A camera according to claim 25, wherein the camera has a viewfinder, and said indicating means allows indication of the output from said light emission confirmation means within said viewfinder.

* * * * *

UNITED STATES PATENT AND TRADEMARK OFFICE
CERTIFICATE OF CORRECTION

PATENT NO. : 4,429,966

DATED : February 7, 1984

INVENTOR(S) : KAZUYA HOSOE, ET AL.

It is certified that error appears in the above-identified patent and that said Letters Patent is hereby corrected as shown below:

Column 1, line 15, "has" should read --have--.

Column 17, line 46, "secnd" should read --second--;
         line 48, "annd" should read --and--.

Claim 16, Column 22, line 22, "signals" should read --signal--.

Signed and Sealed this

Twenty-fourth Day of July 1984

[SEAL]

Attest:

GERALD J. MOSSINGHOFF

Attesting Officer

Commissioner of Patents and Trademarks